(12) United States Patent
Ray et al.

(10) Patent No.: US 11,695,558 B2
(45) Date of Patent: Jul. 4, 2023

(54) SYSTEMS AND METHODS FOR DISTRIBUTED TRUST MODEL AND FRAMEWORK

(71) Applicant: CABLE TELEVISION LABORATORIES, INC., Louisville, CO (US)

(72) Inventors: Indrajit Ray, Fort Collins, CO (US); Steven J. Goeringer, Westminster, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 17/461,357

(22) Filed: Aug. 30, 2021

(65) Prior Publication Data

US 2021/0399890 A1    Dec. 23, 2021

Related U.S. Application Data

(63) Continuation of application No. 16/206,546, filed on Nov. 30, 2018, now Pat. No. 11,108,557.

(60) Provisional application No. 62/592,976, filed on Nov. 30, 2017.

(51) Int. Cl.
    *H04L 9/32*         (2006.01)
    *H04L 9/00*         (2022.01)

(52) U.S. Cl.
    CPC .............. *H04L 9/321* (2013.01); *H04L 9/006* (2013.01); *H04L 9/3239* (2013.01); *H04L 9/3265* (2013.01); *H04L 9/50* (2022.05)

(58) Field of Classification Search
CPC ....... H04L 9/321; H04L 9/006; H04L 9/3239; H04L 9/3265; H04L 9/50
See application file for complete search history.

(56) References Cited

U.S. PATENT DOCUMENTS

| | | | |
|---|---|---|---|
| 2007/0136178 A1* | 6/2007 | Wiseman | G06Q 40/04 705/37 |
| 2009/0144541 A1* | 6/2009 | Kim | H04L 9/321 717/178 |
| 2015/0310195 A1* | 10/2015 | Bailor | G06F 21/45 726/6 |
| 2017/0243287 A1* | 8/2017 | Johnsrud | G06Q 40/025 |
| 2018/0040007 A1* | 2/2018 | Lane | G06Q 50/01 |
| 2019/0182028 A1* | 6/2019 | Arquero | H04L 9/0637 |
| 2019/0228469 A1* | 7/2019 | Yu | G06Q 20/065 |

\* cited by examiner

*Primary Examiner* — Abiy Getachew
(74) *Attorney, Agent, or Firm* — Josh Snider; Snider IP

(57) ABSTRACT

A trust management system is provided for a network communication ecosystem having a plurality of participating entities. The trust management system includes a trust specification engine configured to define and manage trust relationships between a first entity and a second entity of the plurality of participating entities, a trust analysis engine configured to process the results of a trust query from the first entity to the second entity, a trust evaluation engine configured to evaluate the trust relationships managed by the trust specification engine, and a trust monitor configured to (i) monitor one or more trust triggers occurring relevant to at least one of the first and second entities, and (2) update a trust relationship between the first and second entities based on one or more monitored trust triggers.

20 Claims, 8 Drawing Sheets

SYSTEMS AND METHODS FOR DISTRIBUTED TRUST MODEL AND FRAMEWORK

CROSS REFERENCE TO RELATED APPLICATIONS

This application is a continuation of U.S. patent application Ser. No. 16/206,546, filed on Nov. 30, 2018. U.S. patent application Ser. No. 16/206,546 claims the benefit of and priority to U.S. Provisional Patent Application Ser. No. 62/592,976, filed Nov. 30, 2017. Both of these applications are incorporated herein by reference in their entirety.

BACKGROUND

The field of the disclosure relates generally to management of computer networks, and more particularly, to trust establishment and connectivity within such networks.

Conventional electronic devices interact with a number of secure electronic networks and computer systems. Although many of these networks and systems are subject to significant security protections, the electronic devices that interact therewith may not be subject to the same levels of security. Therefore, it is important to be able to reliably determine the identity of such electronic devices in order to provision the devices for use within a particular network, system, or ecosystem. Such provisioning techniques are not trivial. Many conventional electronic devices utilize a Public Key Infrastructure (PKI) to validate an electronic signature of the device in a variety of technology fields, such as telecommunications (e.g., mobile communication devices), the Internet of Things (IoT), online banking, secure email, and e-commerce.

At present, conventional IoT infrastructures are known to employ hardware roots of trust that aim to establish a tamper-resistant secure element, that is, a "black box," that use built-in cryptographic keys to perform cryptographic operations, such as encryption, decryption, and hashing. Examples of such hardware roots of trust include the Trusted Platform Module (TPM) and the Hardware Security Module (HSM). These trust models/schemes are used for remote attestation, with the attestation being typically performed by a third party and/or a Cloud services user. Conventional HSM infrastructures often utilize PKI.

PKI uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PKI includes policies and procedures for encrypting public keys, as well as the creation, management, distribution, usage, storage, and revocation of digital certificates. The PKI binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, the device manufacturers, and users of the device interact over a PKI ecosystem.

In conventional PKI ecosystems, the management of keys, as well as the process of inserting the keys into the devices or secure elements, is problematic, expensive, and difficult to audit. Some manufacturers undertake the burden to provision a secure element of an electronic device, but the requirements to provision PKI at the manufacturing level are also difficult to implement, particularly with respect to such PKI requirements as revocation, potential auditing, and the manufacturer's ability or inability to share CA keys. These difficulties increase significantly where an electronic device is manufactured using a secure element from a different manufacturer, when multiple secure elements are implemented within a single electronic device, and/or when an electronic device or its secure element are provisioned and registered in more than one ecosystem.

Many conventional IoT devices may be deployed in more than one ecosystem (e.g., Open Connectivity Foundation (OCF), AllSeen/AllJoyn, Nest/Thread, Zigbee, etc.), and a different key may be inserted at the time of manufacture on a device for each ecosystem into which deployment is desired. At present, the manufacture of IoT device involves significant cybersecurity nuances and complexities. However, the majority of device manufacturers do not have the requisite cybersecurity experience and knowledge to fully implement secure device provisioning at the manufacturing level, which has negatively impacted the speed at which the IoT has been adopted. Where devices are manufactured for the IoT, many important security concerns have been omitted from the design process.

Trust and security issues present many specific challenges to the cable network ecosystem. Cable network ecosystems may include separate wireless (e.g., base stations, transceivers, etc.) and wireline (e.g., coaxial cable, optical fiber cable (OFC), other physical transport media, etc.) portions, each of which may be owned and controlled by the same or different operators. Many cable network operators, such as Multiple System Operators (MSOs), use Data Over Cable Service Interface Specification (DOCSIS) networks for backhauling Internet traffic. The DOCSIS v3.1 standard presently specifies the security protocols between a modem termination system (e.g., cable modem termination system, or CMTS) and a modem (e.g., cable modem, or CM) using PKI. Key objectives of the DOCSIS specifications are to (i) prevent theft of service, (ii) prevent injection of malicious software into the CM by ensuring the integrity of software downloads, and protecting the privacy of customers by providing link layer encryption from the CM to CMTS.

However, as the cable termination point becomes increasingly the gateway of choice for users to the Internet, serious concerns remain as to how to ensure that only trusted or trustworthy devices are allowed access to the cable infrastructure. Some coexistence standards with the cable ecosystem have emerged from the Open Connectivity Foundation (OCF) IoTivity and the Wi-Fi Alliance (WFA) Hotspot 2.0/Passpoint protocols. Nevertheless, gaps remain for securing the DOCSIS 3.1 security capabilities in the cable network infrastructure with the OCF IoTivity and WFA security.

A conventional edge cable network system includes a CM as the point of connectivity for most devices within a home network, and which is connected to an MTS/CMTS. The CMTS is responsible for authenticating the CM based on device public-key certificates stored at the CM, and for issuing secret session keys to the CM. These session keys are subsequently used for securing the traffic between the CM and the CMTS. Various devices connect to the cable infrastructure on "south side" of a CMTS, such as: (i) devices that terminate cable and are controlled by cable companies (e.g., the CM), and which are typically owned and configured by the MSO or cable company and authenticated by the CMTS using DOCSIS protocols; (ii) devices that do not terminate cable but are controlled by cable companies/MSOs (e.g., PacketCable, home routers, Wi-Fi access points (APs), etc.); and (iii) devices that do not terminate cable and are not controlled by cable companies. PacketCable implements IP based fixed telephony on DOCSIS infrastructure, and includes an embedded Multimedia Terminal Adapter (eMTA) that may be integrated or separate from the CM. The eMTA is managed by the cable operator and uses authentication and encryption based on PKI. Home routers and Wi-Fi APs may be managed by the network operator as well.

Many devices within the cable network ecosystem infrastructure are heterogeneous in nature, and have different computing abilities. From some perspectives, such computational abilities may be defined by the particular functions performed by the specific device. That is, a device that performs relatively more complex operations is generally considered to be more computationally. Conventional system devices are often generally categorized as networking devices, and include an upstream MTS/CMTS, CMs, local area network (LAN) side routers, Wi-Fi APs, bridges, hubs, etc.

A CMTS is generally capable of encoding/decoding CM transmissions, and also acting as a switch/router. The CMTS enables the communication with subscribers CMs. A typical CMTS is able to support between 4,000 and 150,000 CM in a high speed network. The CMTS acts a switch/router when the CMTS connects to the Internet or to other CMTS devices. In many scenarios, a CMTS also may act as a traffic shaper and enforce quality of service (QoS) on traffic flows. The CMTS may also have the ability to run distributed media access control (MAC) protocols when operating with other CMTS devices. An important functionality of a CMTS device is that it can perform public-key based cryptographic operations to authenticate and authorize CMs. A CMTS device thus implicitly has the ability to securely store and verify public-key certificates, to generate session keys, to encrypt and decrypt data, to generate symmetric session keys and to digitally sign data/traffic. For the purposes of the following discussion, it is assumed that the CMTS/CMTS device is fully trusted and difficult to compromise.

The CM is similarly able to encode/decode signals from the CMTS (that is connected on the "north side" of the CM) and provide a layer-2 "switch" type connectivity to the LAN side (i.e., south side) devices. The LAN devices send IP packets to the CM, which are encoded and encrypted by the CM (using session keys provided by the CMTS) for transmission by way of the cable/OFC network. For ease of explanation, it is also assumed herein that the CM is controlled and managed by a cable company/MSO. The CMs store public key certificates as well as the corresponding private keys in a secure manner and are generally considered to be trusted. As an IP addressable network node, a CM may sometimes support functionality of other network layers. For example, a CM may support some sort of TCP/UDP port-based filtering for security purposes (e.g., block NetBIOS traffic out of customer's LAN). The CM may further enable protocols for network management and maintenance such as SNMP, DHCP, and TFTP, for use exclusively by the cable operator (typically secured using authentication, filtering, or access control lists preventing management by third parties). A CM may integrate a router (e.g., an eRouter in the DOCSIS case), and thus sometimes referred to as residential gateways. Many cable operators use or allow use of bridged modems which only operate at layer-2 (no IP routing). The CM may also run application layer protocols (such as HTTP) to support cable subscriber account management needs.

LAN network devices may connect to the CM on the south side thereof, and provide network services to the home LAN network. Various types of routers, Ethernet switches, Wi-Fi APs, bridges, and hubs etc., are considered to constitute such LAN network devices. These devices may support various types of security services, such as traffic filtering based on different criteria, network management, QoS, etc., as well as various application layer protocols. The computational ability of each these standard LAN network device depends on the type of the device, and also the capability incorporated within the device. In some cases, these devices are configured to be an integral portion of the CM, and may be controlled and managed by the cable company (e.g., rendering the devices generally "trusted"). In other cases, the devices may be considered to be trusted if the devices bear certificates that validate to a trusted root CA. Where neither case applies, however, the individual trustworthiness of the device(s) must be evaluated. Conventional techniques have been unable to reliably evaluate the individual trustworthiness of such devices, or allow different levels of access based on a level of determined trustworthiness.

User and home devices include devices that either connect to the CM or use other network devices to connect to the cable network. Given the rapid proliferation of home devices due to IoT networking paradigm, the nature of these devices has extended beyond typical PCs or mobile phones, including the present vast widespread deployment of smart devices such as TVs, radios, thermostats, cameras, environment sensors, security systems, etc. These devices are able to connect to the Internet to send/receive commands/data, and also to receive software updates for on-board firmware. Computational and communication abilities of these devices, as well as security features, vary widely from device to device. For purposes of this description, a device that is able to provide a certificate that chains to an acknowledged root of trust is considered to be trusted; in other cases, the trustworthiness of the device(s) must be evaluated.

The DOCSIS protocol specifies the security standards between the CMTS and the CM. Key objectives of DOCSIS security include: (i) preventing theft of service; (ii) preventing malicious software from infecting the CM by ensuring integrity of software downloads; and (iii) protecting customer privacy by encrypting traffic between the CM and the CMTS at the link layer. To achieve these objectives, the DOCSIS security protocols establish authenticated and secure channels between the CM and the local CMTS. DOCSIS security operates at the link layer, and has three key functionalities: (1) authenticated on-boarding of the CM, (2) security key exchange for traffic encryption; and (3) traffic encryption.

Authenticated DOCSIS on-boarding of the CM to the cable network utilizes public key certificates (e.g., X.509). The PKI that supports these certificates may be maintained by particular entities taking the role of the root CA. A typical CM may store at least three certificates, and sometimes as many as five or more. Two of the CM certificates are used for on-boarding purposes, namely, (i) the CM device certificate (i.e., containing the public key of the CM, along with the CM MAC address, the identity of the manufacturer, and the CM serial number), along with the corresponding private key, and (ii) the certificate of CA issuing device. The third certificate is the Root CA certificate, which is used for verifying software downloads.

Conventional device on-boarding processes typically include the following steps. In one step, the CM presents a device certificate to the CMTS followed by an Authorization request. The Authorization request contains the manufacturer ID of the CM, serial number, CM MAC address, CM public key, an initial cryptographic suite description, and an initialization Security Association identifier. The CMTS validating device certificate is considered to authenticate the CM. Once the CM is authenticated, the CMTS shares the Secret authorization key (i.e., encrypted with CM public key) from which a Key Encryption Key, Message Authentication keys, and Security Association (SA) IDs (and their respective properties) are derived. The exchanged keys are then used for traffic encryption, secure software downloads, multicast encryption, IP provisioning, and configuration file authentication between the CM and the CMTS.

The conventional threat model for DOCSIS security is considered relatively weak at present. The conventional threat model assumes that the CMTS is never malicious, and therefore does not consider the possibility of a man-in-the-middle attack on the link connecting the CM and the CMTS. furthermore, DOCSIS security does not differentiate between the problem of authorization on the one hand, and access control on the other hand. As a result, the conventional DOCSIS threat model fails to implement important security principles, such as least-privilege and separation-of-duty. Conventional DOCSIS models also do not address the LAN side security problem. Since LAN side devices may attach to the CM either directly or indirectly by way of different combinations of routers and switches, it is important that the CM is able to delegate trust evaluation to other entities. However, for authenticating CMs and providing link layer security to the CM-to-CMTS security, the conventional DOCSIS model is considered sufficient. For ease of explanation, the DOCSIS trust model is referred to herein as a first-party trust, and a device presenting a certificate that chains to a certificate issued under a first-party issuer is considered to be fully trusted.

The trust models become more complex when OCF and IoTivity security issues are considered. The OCF ecosystem deals with IoT devices, and OCF security remains under development. The OCF security objective is to protect resources, as well as all hardware and software supporting the protection process. In the OCF paradigm, any physical or software artifact on a device (which may be a logical entity that conforms to OCF specifications) that needs to be manipulated or made visible across a network is considered a resource. OCF security measures aim to provide protection by way of a combination of strong authentication techniques that ensure only authenticated users have access to resources. OCF security also aims to protect the flexible and fine-grained access control policies defined in a simplified Role-Based Access Control (RBAC) model. As described herein, resource protection includes protection of data both at rest, and during transit. Protection of data during transit may be performed at the transport layer or at the OCF resource layer (e.g., conceptually between the application layer and the transport layer). OCF security measures do not presently address protection of resources at rest.

The OCF paradigm adopts a client-server communication model for achieving security, and the principle of interoperability with a variety of transport layer protocols has been adopted by the OCF community. Thus, OCF adopts the (D)TLS protocol to achieve transport layer security during the device on-boarding stage. OCF further adopts the notion of credentials for security. That is, OCF devices use credentials to prove/validate the identities of different parties in communications. Credentials may be symmetric (e.g., secret keys, tokens, etc.), or asymmetric (e.g., public key certificates). Devices May store their own credentials, as well as credentials of other devices that a device may have received during various phases of communication. OCF has formulated a public key certification hierarchy for issuing certificates.

Conventional OCF security protocols also adopt a strong ownership establishment procedure that enables a legitimate owner/purchaser to assert and manage ownership on the device. Once an ownership is established, a device is provided a unique identity in the OCF-compliant network to which the device attaches. Ownership establishment allows trust in device to be explicitly tied to the trust of the user of the device. Such user-only-based trust mechanisms, however, are unable to address the problem of a trusted user inadvertently using an infected (i.e., untrusted) device. Additionally, OCF provides a significant amount of flexibility in terms of features, which can make security management quite difficult. OCF security techniques also do not provide a built-in cascaded authorization/trust and privilege delegation principle, which is, for example, a needed capability in the case where a device within a local OCF network needs to communicate with remote devices (e.g., in a cloud). Even where certificates are utilized to address this challenge, it remains very difficult to perform privilege revocation.

In comparison, the WFA security objective is to achieve link-layer security between a Wi-Fi enabled device and a base station. In practice, this WFA a goal would theoretically allow only an authorized device to connect to a wireless network, and also protect user data in transit between two wireless devices. Another WFA objective is to enable technically an experienced users to easily connect to Wi-Fi networks without special skills or understanding of WFA protocols/standards (e.g., Hotspot 2.0, IEEE 802.11i and IEEE 802.1x). WFA security is achieved using either a pre-shared key or by public key certificates. WFA security measures (as well as those of IEEE 802.11i and IEEE 802.1x) also do not presently address security of data at rest.

Accordingly, it is desired to develop new systems and methods that are capable of protecting cable ecosystem infrastructures from security threats posed by various LAN devices (e.g., in the home), without sacrificing QoS. It is further desirable to provide cable companies and MSOs the ability to control the type and degree of access provided to individual devices, to both minimize the security threat posed therefrom, and while also reducing operational costs. For the purposes of this discussion, fully trusted devices are considered to pose minimal security threats, and devices that are managed by cable companies are considered to be fully trusted.

Nevertheless, the present cable network ecosystem is undergoing continual change in expansion, and therefore must be assumed that not every device entering the ecosystem may be fully trusted. Accordingly, systems and methods are needed that enable the evaluation of every device to assess its individual trustworthiness, such that the system may accurately judge the risks posed by a particular device, and mitigate the risk according to such judgments. In the case of devices bearing certificates issued by PKIs recognized by the first-party PKI, a transitive trust chain May be established between such devices and the respective cable operator, thereby rendering such devices as trustworthy. However, most of the billions of IoT devices presently deployed may not contain a recognized certificate, and therefore an improved model is desired that is capable of defining trustworthiness of such devices seeking to enter or connect with the ecosystem.

Conventional binary trust models (i.e., trusted or not trusted) are insufficient to accurately evaluate the trustworthiness of an individual device, and particularly as the devices and ecosystems become more complex and intertwined. For example, a particular medical device may not be fully trusted within a particular or hospital network, but data collected by the device related to a patient's health may be critical to transmit to the network.

BRIEF SUMMARY

In an embodiment, a trust management system is provided for a network communication ecosystem having a plurality of participating entities. The trust management system includes a trust specification engine configured to define and manage trust relationships between a first entity and a second entity of the plurality of participating entities, a trust analysis engine configured to process the results of a trust query from the first entity to the second entity, a trust evaluation engine configured to evaluate the trust relationships managed by the trust specification engine, and a trust monitor configured to (i) monitor one or more trust triggers occurring relevant to at least one of the first and second entities, and (2) update a trust relationship between the first and second entities based on one or more monitored trust triggers.

In an embodiment, a communication network ecosystem includes at least one connective device configured to request access to the communication network ecosystem, a cable network infrastructure configured to receive an access request from the at least one connective device and process the received device access request, a trust management system configured to define and manage a trust relationship between the cable network infrastructure and the at least one connective device, a trust-based access control system configured to determine (i) a trust level of the at least one connective device, and (ii) at least one set of permissions corresponding to the determined trust level and at least one access type included in the received device access request. The ecosystem further includes a trust monitoring system configured to (i) monitor at least one of the trust management system and at least one connective device for trust indicator values, and (ii) communicate updated trust indicator values to the at least one of the trust management system and at least one connective device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
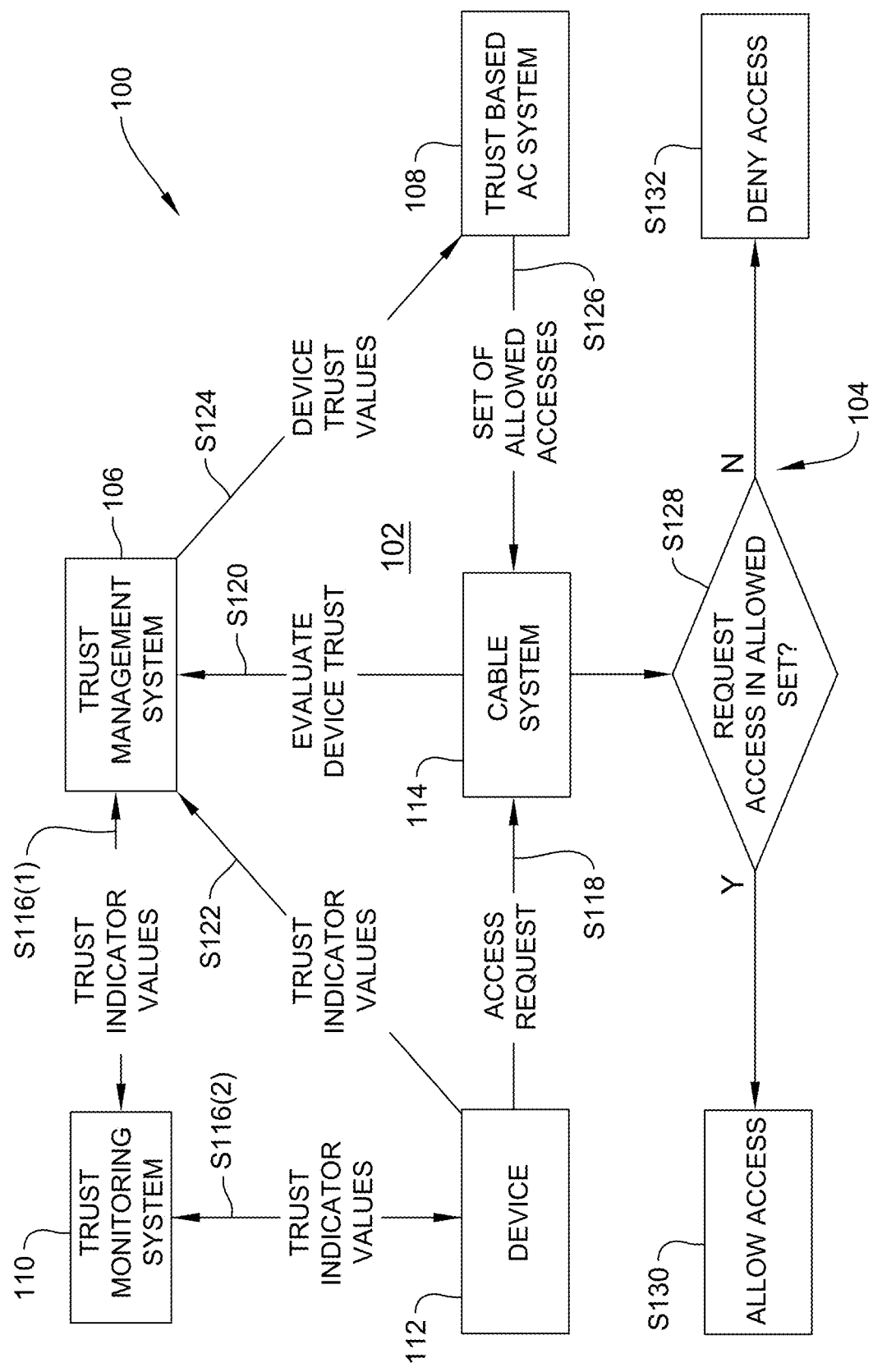
FIG. 1 is a schematic illustration of a trust framework architecture for an exemplary cable network ecosystem, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

As used herein, unless specified to the contrary, "modem termination system," or "MTS'" may refer to one or more of a CMTS, an optical network terminal (ONT), an optical line terminal (OLT), a network termination unit, a satellite termination unit, and/or other termination devices and systems. Similarly, "modem" may refer to one or more of a CM, an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative systems and methods for authentication, connectivity, and trust establishment for computer networks. The present embodiments introduce, among other solutions, a non-binary model of trust that is advantageously capable of identifying the model parameters, and which also includes methodologies for evaluating such parameters. In some embodiments, an information aggregation protocol is further introduced for combining model parameters into an aggregated trust value. The design of the present trust model further advantageously is able to integrate the non-binary model of trust to both de-facto and evolving standards.

The distributed trust model and framework described herein enables cable operators to more reliably determine the trustworthiness of various devices that can potentially connect to the LAN or WLAN side of a cable modem. It is understood that WLAN is not exclusive to Wi-Fi, and may include a number of radio access technologies accepted by a given home network implementation. Nevertheless, for the purposes of this description, the WLAN model is described for illustration purposes and not in a limiting sense, as an exemplary case for determining the trustworthiness of devices connecting to the cable infrastructure. The WLAN model is also useful to describe how the present systems and methods are capable of extending to other network architectures, such as optical, Ethernet, and wireless infrastructures for residential, business, and/or enterprise services.

As described herein, the distributed trust model and framework generally refers to one or more individual innovative embodiments, any or all of which may be implemented alone (i.e., independently of the overall architecture), or in any combination thereof. The individual embodiments include, without limitation, systems and methods for one or more of: (1) a trust framework architecture; (2) a formal trust model; (3) an access type graph; (4) trust indicator(s) for systems (e.g., cable, wireless, and/or passive optical network (PON)), service providers (e.g., LTE, DSL, etc.), and/or environments (e.g., virtualized, cloud, enterprise, government, etc.); (5) a trust management system (e.g., an immutable database, blockchain, or consensus-based database to implement the immutable database); (6) a manufacturer trust computation; (7) a trust-based access control; and (8) a synthetic device identity (e.g., using a device profile enabled under the IETF internet drafts on MUD, created through active and passive fingerprinting techniques, etc.).

The present distributed trust model and framework is described herein, for illustration purposes and not in a limiting sense, within the context of a network supported by PKI. The person of ordinary skill in the art though, will understand, after reading and comprehending the present disclosure, that the principles herein may be applied to any trust management architecture (physical or virtual) to include token-based systems (e.g., Kerberos, or symmetric key systems such as 3GPP/LTE/GSMA, etc.).

As described above, at present, except for the sRouter and some proprietary means of supporting Wi-Fi APs, there is no conventional security or trust model presently in place between the modem (e.g., the CM) and the ecosystem of connected devices. Without a methodology to evaluate the trustworthiness of devices, a significant probability exists that untrustworthy devices connected to the infrastructure may be used as carriers of large-scale attacks against the infrastructure itself, and/or against other connected devices and networks. All of the OCF and WFA have proposed bridging the public-key certificate-based binary trust model of cable with other eco-systems, second-party devices certified by the OCF and WFA (and bearing public-key certificates therefrom) are likely to be as trustworthy the same level as devices certified by the first-party operator. However, due to the sheer scale and variety of connected devices manufacturers, in addition to the present lack of strict certifications and controls, it is almost impossible to create or maintain a uniform public-key certificate based trust model as the basis of trust for the cable ecosystem paradigm. Furthermore, the dynamic nature of present connected devices precludes the satisfactory use of a binary trust model, because such devices typically need to be continuously monitored and updated. The non-binary model of the present embodiments resolves this problem not only for second-party devices, but also for third-party devices manufactured by entities having no business relationship or understanding with the first party.

The present embodiments thus describe and illustrate: (i) the cable ecosystem in general, as well as the OCF and WFA; (ii) assumptions for a distributed trust framework for secure cable, as well as the primary challenges involved in securing the cable infrastructure from the variety of devices that can potentially connect with the cable ecosystem; (iii) a distributed trust model and framework for securing the cable ecosystem by evaluating different properties (e.g., category of the devices, device manufacturer trust, connection profile etc.) of connected devices and determining a weighted trust score based on how the properties are evaluated; (iv) a reputation-based model for the device manufacturer (e.g., the more reputed is an manufacturer, the more the more trustworthy will be devices manufactured by that manufacturer, namely, the manufacturer reputation level influences the trust level of the device); (v) a trust-based access control model that may utilize the trust model as the basis for defining authorization policies for determining the type and/or degree of access of connected devices to the cable infrastructure; and (vi) further expansion capabilities of the present trust model, as well as examples demonstrating proof-of-concept.

Distributed Trust Model and Framework

The present distributed trust model and framework enables cable operators/companies/networks to determine the trustworthiness of various devices that might potentially connect to the LAN side of a modem, whether the devices terminate or do not terminate the cable, and whether the devices are or are not controlled by the cable operator. The present embodiments advantageously enable the automatic determination of the trustworthiness of devices that do not terminate cable and are not controlled by cable companies (e.g., most IoT devices). In exemplary embodiments, the trust level of the device is determined according to the organizational policies of the cable operator entity, which is then able to provide the device with access according to the degree desired by the operator, thereby potentially allowing some level of system access to a device that is not fully trusted, but of no greater than a level needed to minimizes the security threat to the table infrastructure and/or other connected devices and services. In some embodiments, the organizational policy of the operator may pre-determine discrete levels representing different types of access that are available to devices connecting to the cable infrastructure, and what trust level would be necessary to grant access at each pre-determined level (e.g., the trust level to access type mapping).

Distributed Trust Model

The trust model described herein enables enforcement of fine-grained access control for various devices depending on the perceived trust values of the devices. In an exemplary embodiment, these trust values are normalized within the range [0, 1]. Accordingly, the present trust model is formally defined to enable accurate estimation of the trust of various devices based on particular metrics. The present trust model is then able to compute/calculate the degree to which an attached or connected device may be trusted by measuring different trust indicators relevant to the device. The present trust model is further capable of dynamically monitoring triggers, namely, changes to the parameters or metrics that lead to changes in values of the measured trust indicators. The trust values at a given period of time may then be used to enforce the access control policies corresponding to the particular trust levels of the operator.

FIG. 1 is a schematic illustration of a trust framework architecture 100 for an exemplary cable network ecosystem 102. Architecture 100 is configured to manage and monitor trust throughout ecosystem 102 and implement an access process 104 among various parties of ecosystem 102. Architecture 100 represents an exemplary embodiment, for illustrative purposes, to implement a trust framework for ecosystem 102, and is not intended to be limiting. Other architectures are contemplated by the present inventors, which do not depart from the scope of the embodiments. Furthermore, for ease of explanation, some components that may be implemented within architecture 100 are not illustrated, nor are generic hardware or software structures that may be included to facilitate operable communication among ecosystem components.

In the exemplary embodiment depicted in FIG. 1, ecosystem 102 includes a trust management system 106, a trust-based access control system 108, a trust monitoring system 110, and one or more devices 112 seeking access to, or connection with, cable system 114. Trust management system 106 may include, for example, a trust model (not shown in FIG. 1, described further below) and a trust evaluation engine (also not shown in FIG. 1). Trust-based access control system 108 may include, for example, a decision engine (not separately shown) to select the appropriate policies relevant to an individual device 112 accessing cable system 114. In an exemplary embodiment, each device 112 is assumed, for simplicity of explanation, to have its own unique ID. Further in the exemplary embodiment, trust monitoring system 110 is configured to dynamically monitor trust triggers within ecosystem 102, and evaluate one or more trust indicators (described further below) relevant to devices 112.

For purposes of this disclosure, cable system 114 may refer to, or include, any separate hardware apparatus or software process functioning on behalf of a cable ecosystem that is tasked with determining whether initial, additional, and/or continuing access to the cable infrastructure should be permitted to a requesting device 112. Accordingly, in this example, access process 104 is described with respect to devices 112 being CMs. Nevertheless, the person of ordinary skill in the art will understand that the principles of the embodiments described herein are applicable with respect to devices other than CMs. For further ease of explanation, the description herein assumes that the "trustor" is cable system 114 (e.g., a cable operator computer system or cable operator managed apparatus), and that the "trustee" is at least one device 112 (e.g., a CM) seeking attachment to the trustor.

In some embodiments of architecture 100, some or all of the respective parties of ecosystem 102 are in direct or indirect operable communication with an electronic communications network (e.g., Internet, LAN, WAN, WLAN, etc.). In at least one embodiment, one or more of the ecosystem parties is further in operable communication with a CA (not shown), where access to, or verification of, digital certificates is desired. That is, a CA may be utilized to verify the digital identities of the respective parties on the electronic communications network and issue a digital certificate to function as a trusted root certificate (e.g., embedded in hardware or software of the one or more parties) for individual transaction steps of process 104. In an exemplary embodiment, PKI-based certificates are utilized to implement secure communication between an authentication of parties for each transaction.

In exemplary operation, process 104 begins at step S116, in which trust monitoring system 110 monitors at least one of trust management system 106 (e.g., step S116(1)) and device 112 (e.g., step S116(2)) for trust indicator values. In an exemplary embodiment of step S116, one or both of trust management system 106 and device 112 receive trust indicator values from trust monitoring system 110. In step S118, device 112 requests access to cable system 114. In step S120, cable system 114 communicates with trust management system 106 to evaluate the trustworthiness of device 112. In step S122, trust management system obtains trust indicator values from device 112. In step S124, trust management system 106 applies the trust indicator values received from device 112 to a trust model (see e.g., FIG. 5, described below), and transmits device trust values to trust-based access control system 108.

In step S126, a set of allowed access levels are provided to cable system 114 from trust-based access control system 108. In step S128, cable system 114 (e.g., a processor thereof) evaluates the device access request received in step S118 against the set of allowed access levels received in step S126, and determines if the device access request conforms to at least one of the set of allowed access levels. If, in step S128, cable system 114 determines that the request is within an allowed access level from the set, process 104 proceeds to step S130, in which device 112 is allowed access to cable system 114 for at least one access level within the provided set. If, however, in step S128, cable system 114 determines that the access request is not within the set of allowed access levels, process 104 instead proceeds to step S132, in which device 112 is denied access to cable system 114. In an embodiment of step S132, the access denial is complete, that is, device 112 is denied access to cable system 114 at any level.

Except where described to the contrary, the several steps of process 104 may be performed in a different order than that described above. In some instances, one or more of these steps may be performed simultaneously. In some embodiments, each transaction of the steps of process 104 may be submitted to a digital ledger or immutable database (not shown in FIG. 1, see FIG. 5, below), verified by the processors thereof (e.g., by a consensus model), and then recorded (e.g., as new blocks) onto the ledger/database. In such cases, each of parties of ecosystem 102 may include a party-specific ID that enables digital verification by the immutable database (e.g., a blockchain) for each respective transaction.

In an exemplary embodiment of architecture 100, cable system 114 is advantageously configured to trust device 112, once a device 112 is accessibly connected with cable system 114, according to different degrees of trust for different types of access. That is, according to the present systems and methods, cable system 114 is capable of trusting device 112 according to a non-binary trust model that includes a plurality of degrees of trust between the extremes of a fully trusted device (e.g., complete access) and an untrusted device (e.g., no access). The conventional binary trust model is only capable of allowing zero or total access by a device, and is only adjustable with respect to the number of devices that are granted access. That is, the conventional system may allow full access to more or fewer devices, but is unable to adjust the level of access of a single device beyond or within the binary all-or-nothing access choice.

According to the present embodiments though, a cable system trusts a connected device according to the type of access requested (e.g., step S118) in the trustworthiness of the device as evaluated by the trust management system (e.g., step S124). Accordingly, the set of allowed access levels (e.g., step S126) includes at least one access level that permits at least some access to the system, but not complete access. In the exemplary embodiment, an access type is bull of intuitively capturing the nature of resource-access requested by a device. As described herein, the definition of "trust" is therefore neither absolute nor specific to a device, but instead dependent on the context of the access that is captured by the notion of access type. This context may include considerations of architectural, topological, internal/external security indicators, and other factors that may dynamically change over time. In other words, the context may vary temporally.

In some embodiments, the access types of the device(s) are modeled using an access graph (see FIG. 4, below). Additionally, in some embodiments, the trust model formalities may be outlined such that the trust model may include intuitions that operate within the model between the trustor and the trustee. In the example described above, the trustor is the cable system and the trustee is the CM. The exemplary embodiments below, on the other hand, illustrated the versatility of the present systems and methods, in that the CM may operate as the trustor (as opposed to the trustee, as described above), and the device may be a separate apparatus (e.g., an IoT device) that connects to the cable ecosystem (e.g., ecosystem 102) through the CM. In the following discussion, the term "CM" denotes the modem, and the term "D" denotes the device.

The distributed trust model of the present embodiments thus evaluates trust based on one or more of several factors, elements, and/or parameters, including without limitation: (i) an access type-based trust; (ii) degree of trust; (iii) a trust history; (iv) a trust history log; (v) a trust history score computation; and (vi) a trust value at a given (e.g., present) time. These factors may be expressed according to logical expressions and mathematical formulas as follows.

The access type-based trust, for example, may be represented according to the logical expression $$CM_i \overset{c}{\Rightarrow} D_j,$$

where the modem $CM_i$ (i.e., the trustor) will trust the device $D_j$ (i.e., the trustee) for a specific access type c. The access type c thus determines what specific actions are possible among the various resources of the cable infrastructure.

The degree of trust, on the other hand, represents the specific level to which the CM trusts the device. In an embodiment, the degree of trust is computed periodically. In other embodiments, the degree of trust is triggered by the occurrence of one or more trust triggers (described further below). The degree of trust may be represented according to the logical expression $$V_t(CM_i \overset{c}{\Rightarrow} D_j) \in [0 \ldots 1],$$

where $V_t$ is the degree (or level) of trust that the trustor (also referred to herein as the trust evaluator) has on the trustee for the access type c as computed at time t. Accordingly, a value of 0 indicates that the trust evaluator has no trust on the device (i.e., a lack of trust). In some instances, a lack of trust may result from the evaluator not having any information about the device to compute a trust value, or that the result of trust evaluation has been 0. A value of 1, on the other hand, indicates that the trust evaluator fully trusts the device. Devices that are controlled by cable operators, for example, or devices that present a certificate that can be evaluated to a root CA recognized by the first-party are representative of fully trusted devices.

The trust history represents a history of trust values that may be maintained (e.g., in a database) of the trust management system (e.g., trust management system 106) corresponding to the relevant trustor (e.g., a CM in this example, or cable system 114, in the example described above). The history of trust values may, for example, may be maintained by the trustor to include determines trust values for various trustees that have been encountered by the trustor.

In an exemplary embodiment, the trust history may further include a log (described further below with respect to FIG. 2) of the trust indicator values that resulted in the corresponding trust levels maintained in the trust history for the various encountered devices. By maintaining a trust history the above the trust management system is advantageously enabled to keep track of how the trustworthiness of a device has evolved, if at all, over time. That is, devices that were once trusted may become compromised, and devices that may have been initially less trusted due to a lack of information may exhibit a pattern of trustworthiness over time. The trust history thus provides a useful tool in determining a present trustworthiness of a device.

The trust history may be useful to affect the determination of a present trust level for several reasons. For example, situations may often arise where the relevant trust indicators cannot be evaluated for various reasons; where the system is unable to determine the present trustworthiness, the trust history will provide a reasonable estimate to evaluate the trustworthiness of the device. The trust history provides a reasonable estimate in these situations based on the assumption that a device that was once trusted (at some level) at a previous time should not immediately become untrustworthy except in limited circumstances. The trust history score will therefore allow such potential arbitrary changes to be smoothed into a more reliable picture.

Figure 2:
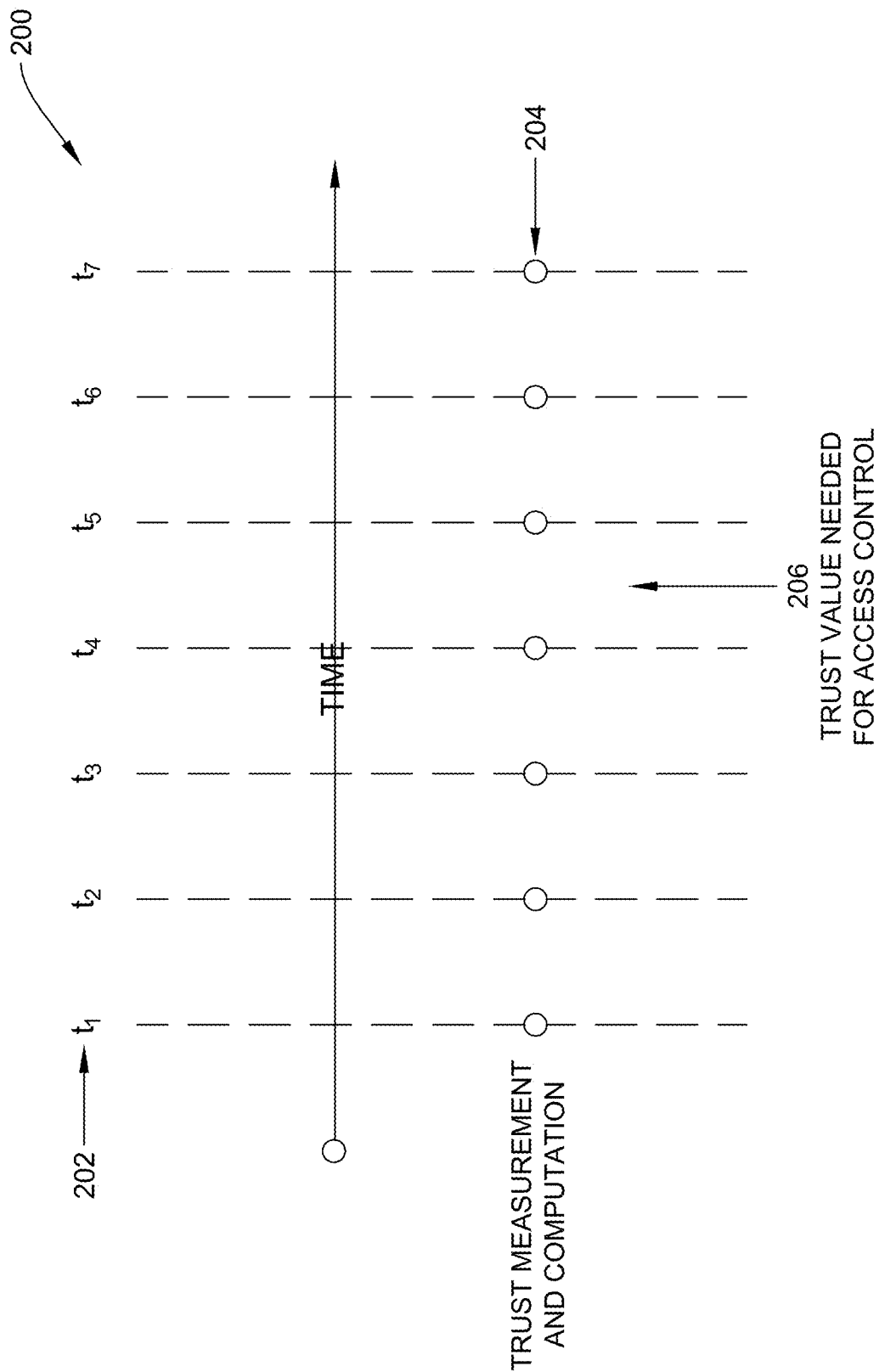
FIG. 2 depicts an exemplary trust history log process, in accordance with an embodiment.

FIG. 2 depicts an exemplary trust history log process 200. In an exemplary embodiment, log process 200 collects [key, value] pair information of trustees encountered by the trustor, and dynamically updates the [key, value] pair information over time t. In this example, the key is representative of discrete time instances 202 (i.e., $t_1$ through $t_7$, in the example depicted in FIG. 2), and the value is representative of a trust value 204 that is being computed and recorded. Trust values 204 may be represented according to the expression value= $[P_{dev}, h_t]$, where $P_{dev}$ represents the trust indicator score of the trustee/device, and $h_t$ represents the trust history score of the trustee/device computed at a present discrete time instance 202, $t_n$, using the trust level (e.g., value 204) of the trustee/device at time $t_{n-1}$. As can be seen from the example depicted in FIG. 2, in the case of a particular trust value 206 that is needed for access control after the fourth discrete time instance 202 (e.g., at time $t_4+$) may be evaluated from the trust history of trust values 204 obtained at $t_4$.

The trust history score computation therefore represents a calculation of the trust history score $h_t$ at the present time $t_n$, based on a trust value 204 determined at time $t_{n-1}$ (e.g., previous time instance 202), which may be represented as $V_{t_{n-1}}$. The difference between discrete time instances 202 and may then be expressed as $\Delta t = t_n - t_{n-1}$. Accordingly, the trust history score at time $t_n$ is may be expressed by:

$$h_t = V_{t_{n-1}} \times e^{-((V_{t_{n-1}})^{-1} \Delta t)^{2k}},$$

where $k \geq 1$, and k is a relatively small integer for determining the rate of change of trust. In an exemplary embodiment, the value for k is assigned by the operator of the cable system as a system policy.

From these calculations, the trust value at a present time may be accurately determined. In an exemplary embodiment, the degree of trust given to a trustor to a trustee at the present time may be expressed by:

$$V_{t_n}(CM_i \overset{c}{\Rightarrow} D_j) = P_{dev} \otimes h_t,$$

where $\otimes$ indicates an operator (described further below) for combining the [key, value] trust parameters into a single value in [0 . . . 1].

The distributed trust model of the present embodiments is further able to define (i) device trust indicators to quantify trust, and (ii) a belief system to determine the accuracy of trust indicators. Accordingly, in an exemplary embodiment, each trustee/device is associated with a vector p of trust indicators k, which may then be used to determine the trust indicator score $P_{dev}$ that may be finally used to evaluate the trust of a device. For the purposes of this description, a device trust indicator is defined as some measurable property of a device whose value impacts the trust level of the device. In this regard, an internal trust indicator of a device is therefore a property that is intrinsic to the device, or a property associated with the device that emerges from within the cable ecosystem. In contrast, an external trust indicator refers herein to a property that is extrinsic to the device, or a property that emerges from outside of the cable ecosystem. The trust indicator vector p may be expressed as:

$$p_t = [k_1, k_2, \ldots, k_j, \ldots, k_m],$$

Based on the assumption that each device is associated with an ordered set, of size m, of trust indicators k. Therefore, the trust indicator $k_j$ will have a value $|k_j|$, and may be evaluated by a trust monitor (e.g., trust monitoring system 110, FIG. 1). In many cases, some of the trust indicators k may be measured accurately. In some cases, however, some of the trust indicators k may only be measured probabilistically with some degree of confidence.

Figure 3:
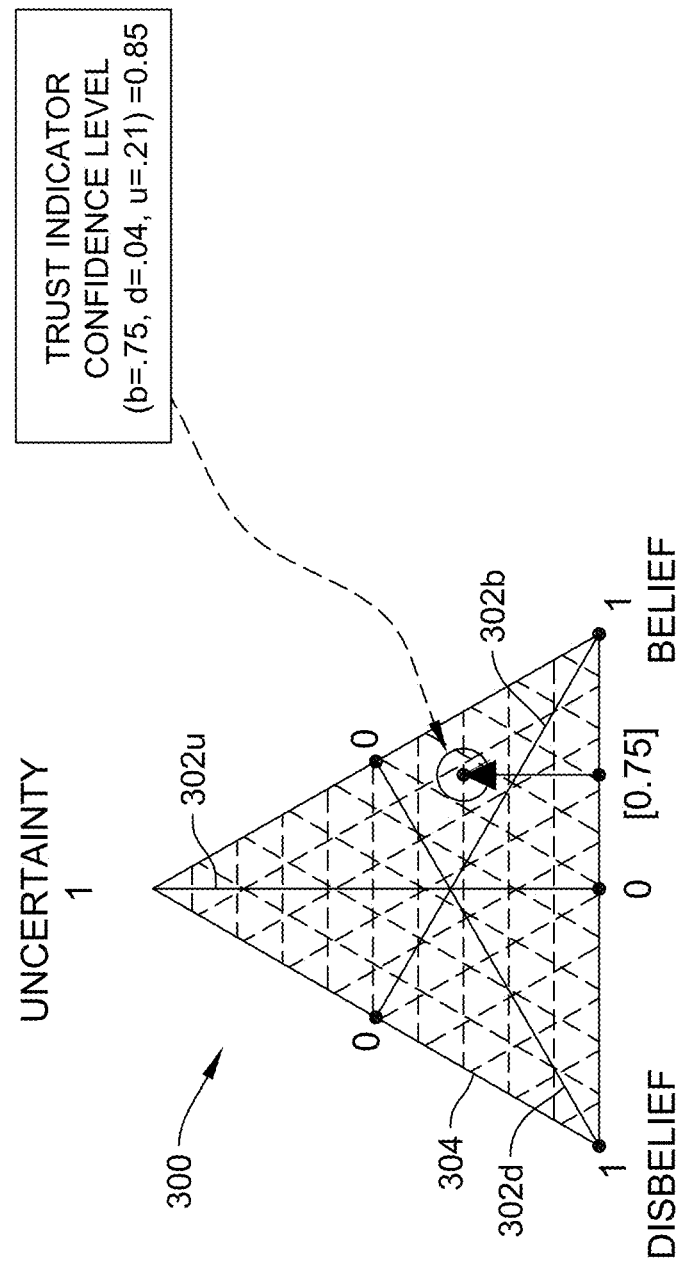
FIG. 3 is a graphical illustration of an exemplary trust indicator confidence level computation process, in accordance with an embodiment.

FIG. 3 is a graphical illustration of an exemplary trust indicator confidence level computation process 300. In an exemplary embodiment, confidence level computation process 300 may be implemented to determine the degree of confidence of a measurement of a trust indicator k, based on the belief system of the trust model. That is, the degree of belief in a trust indicator value may be mathematically determined according to trust indicator confidence level computation process 300.

As described above, even though the system will theoretically make all reasonable attempts to measure a trust indicator accurately, there will always be a degree of uncertainty as to how accurate is the trust indicator value. To address this concern, a belief system is defined according to the present embodiments based on subjective logic (described further below) that allows the adjustment of the trust indicator values based on the perceived beliefs of the measurements. In this respect, the belief system may be seen as a measure or accuracy percentage of a given trust indicator value.

More particularly, each time a trust indicator $k_j$ is evaluated, the proposition that the measurement is accurate is subjectively judged by association with four values 302: (1) a belief $b_{k_j} \in [0 \ldots 1]$ that the proposition is true; (2) a belief $d_{k_j} \in [0 \ldots 1]$ that the proposition is false; (3) a belief $u_{k_j} \in [0 \ldots 1]$ that is neither committed to the truth nor falsehood about the proposition; and (4) an a priori probability $a_{k_j}$ about the truth of the proposition in the absence of a specific belief. Values 302 may then be graphically correlated across a multiple-axis graph 304, as illustrated in the exemplary embodiment depicted in FIG. 3.

Since the trust model operates in a binary state space, the value for a priori probability $a_{k_j}$ is set to 0.5, according to the theory of subjective logic (described below). As illustrated in multiple-axis graph 304, values 302 (e.g., $b_j$, $d_j$, and $u_j$) are related according to the expression $b_j + d_j + u_j = 1$. Using values 302, a confidence level $o_j$ of a measured trust indicator may be found according to $o_j = b_j + a_j u_j$. In an exemplary embodiment, as a trust indicator is being evaluated, it is assumed that values 302 for the belief, disbelief, and uncertainty (e.g., $b_j$, $d_j$, and $u_j$, respectively) associated with the measure are provided to the trust management system.

The trust indicators $k_j$ may be further evaluating according to a calculated trust indicator importance vector, as well as detected trust triggers. The trust indicator importance vector $p_{imp}$ is a 1-dimensional vector, which may be represented according to $p_{imp} = [p_1, p_2, \ldots, p_j, \ldots, p_m]$, where $p_j$ denotes the importance weight of trust indicator $k_j$. Trust triggers, on the other hand, are events that change the value of a trust indicator. However, not all trust indicators may have associated triggers, and some trust indicators may have more than one trigger, whereas other trust indicators may share the same trigger. Trust triggers may be internal or external.

Accordingly, the trust indicator score $P_{dev}$ of a device, at time $t_n$, may be computed by defining a single value function for each trust indicator, and then multiplying normalized trust indicator values with the corresponding trust indicator confidence level and trust indicator importance. In an exemplary embodiment, the single value function $f_j(k_j)$ may be defined as $$f_j(k_j) = \frac{|k_j|}{\max_j |k_j|} \times 100,$$

for each trust indicator, that is, where $|k_j|$ represents the value of the particular trust indicator $k_j$. The single value function therefore serves to normalize different unit measures such that the different values can be summed together under single standard scale. Once the single value function is determined, each normalized trust indicator value may be multiplied in $p_j$ with the corresponding trust indicator confidence level and trust indicator importance, and then normalized to a scale of [0 . . . 1].

The trust indicator score for the device may then be calculated according to:

$$P_{dev} = \sum_{j=1}^{m} \frac{f_j(k_j) o_j p_j}{\max_j \{f_j(k_j) o_j p_j\}}$$

Access Types and Deriving Trust Value based on Related Access Type

The distributed trust model associates device trust values with various access types. While the degree of trust of a device is computed independent of the access request made by the device, access control is based on the evaluated trust value. Often, a situation may arise when a new access request is made, but there is no opportunity to re-evaluate the device trust value. However, it may be determined that the access requested is "very similar to" a previously granted access request. Accordingly, in such cases, it may be reasonable to determine the requested access based on the trust value determined during the previous access request.

To make the determination that a present access request is "similar to" a previous access request, the present systems and methods are configured to define "access types" to individual requests. In an exemplary embodiment, when an access request is granted or denied, the system it is enabled to store (e.g., as an update only audit log) a record of the form <access type, trust value, granted/denied>. Thus, if a new requested access is similar to an access request that was previously granted, then a trust value may be obtained from the log (e.g., FIG. 2, above) and scaled appropriately such that the previous value may be used to make a present access decision.

According to these innovative techniques, a trust value that is computed for a specific access type may then be subsequently extrapolated for a trust evaluation for a related access type. The relationships between different access types may be represented in the form of an access type graph, as described below with respect to FIG. 4.

Figure 4:
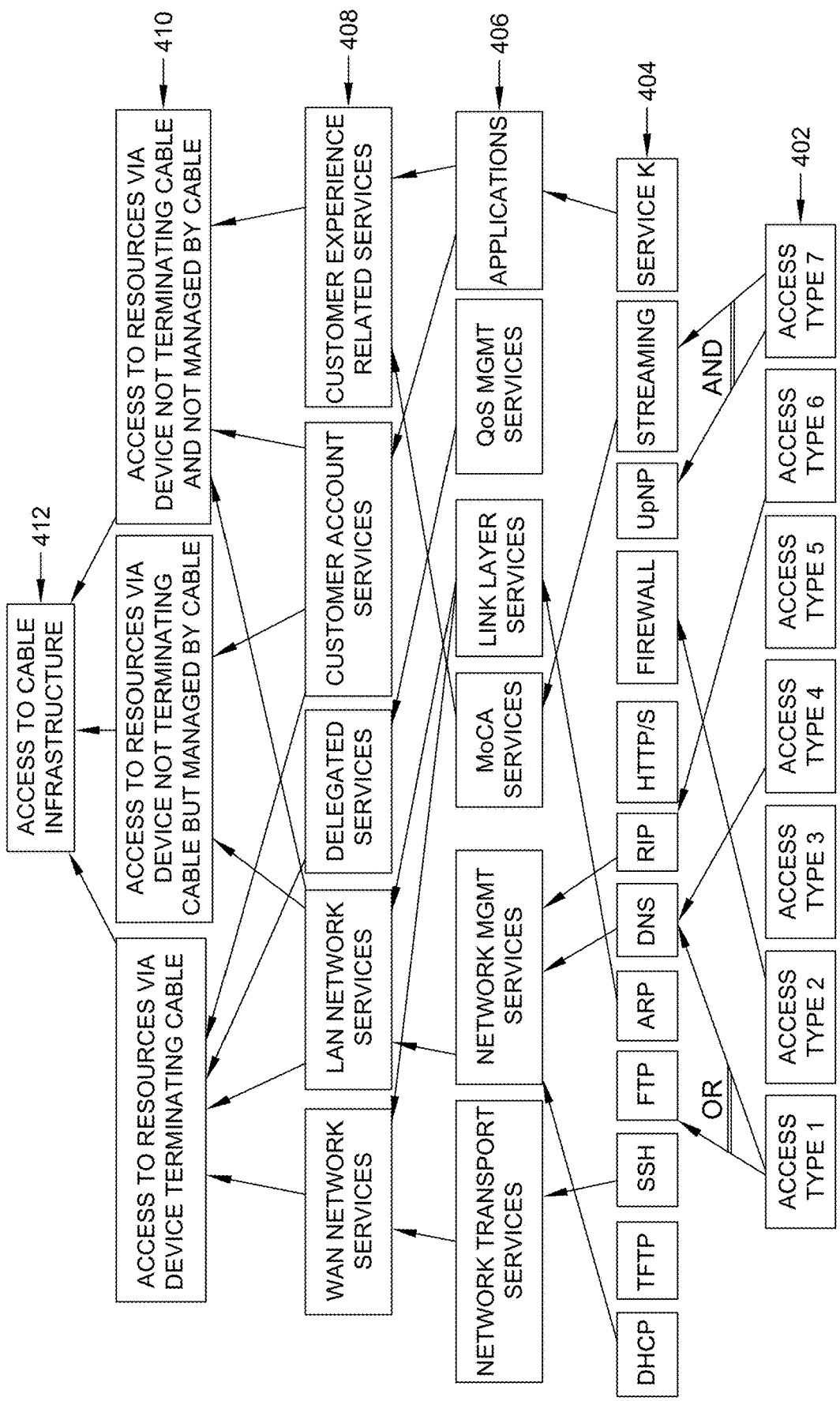
FIG. 4 is a schematic illustration of an exemplary access type graph structure, in accordance with an embodiment.

FIG. 4 is a schematic illustration of an exemplary access type graph structure 400. In an embodiment, access type graph structure 400 is installation dependent. In some embodiments, access type graph structure 400 may be partially determined a priori. In at least one embodiment, access type graph structure 400 is periodically updated depending on what new devices are attached to the system. The trust management system (e.g., trust management system 106, FIG. 1) may, for example, be configured to monitor all traffic passing through the system and may be further configured to read the header information within the traffic to determine an access type for a particular device. The cable network system (e.g., cable system 114, FIG. 1) is then enabled to trust a device according to the particular access type.

In the exemplary embodiment depicted in FIG. 4, structure 400 is illustrated as a useful access type graph for the network example. The person of ordinary skill in the art will understand, after reading and comprehending the present disclosure, that the network example is provided for illustrative purposes, and is not intended to be limiting. For example, structure 400 may be reconfigured according to embodiments relating to processes, function calls, application programming interfaces (APIs) read/write protocols, database queries, etc.

In the exemplary embodiment, structure 400 is represented as a multi-tiered design, with each tier including one or more nodes. More particularly, as depicted in FIG. 4, a first (bottom) tier 402 is constituted of the several access types (e.g., the nodes) available to requesting devices. The access types of first tier 402 determine the pathway of a device through level-1 network services at a second tier 404, level-2 network services at a third tier 406, level-3 network services at a fourth tier 408, a resource access level at a fifth tier 410, and eventual access to the cable infrastructure at a sixth tier 412.

As described herein, the access types refer to the capability to (i) access resources controlled by the cable network (e.g., network services provided by the CM and attached devices, such as DHCP, SSH, HTTPS, TFTP, FTP, TELNET), such as the resource nodes depicted in second tier 404; (ii) make decisions on behalf of the cable network (e.g., access control for LAN devices, QoS, etc.); and (iii) provide services on behalf of the cable network (e.g., network partitioning, resource allocation, network services) such as the network service nodes depicted in third tier 406 and fourth tier 408.

In an exemplary embodiment, a particular access type $AT_i$ may be represented by a set of keywords, individually denoted as at, and collectively as a keyword set $KS_{AT_i}$, or at $\in KS_{AT_i}$. Each keyword in the keyword set $KS_{AT_i}$ may then be used to describe the access type $AT_i$. The keywords at within a single set $KS_{AT_i}$ will be semantically equivalent to one another, since each keyword expresses the same access type. In this example, each keyword at $\in KS_{AT_i}$ is associated with a domain $D_{at}$ that defines the set of values associated with at.

A derived access type $DAT_j$ may then be specified by a condition at $\boxed{\cdot}$ d defined over an access type $AT_j$, where at $\in KS_{AT_i}$, and $\boxed{\cdot}$ represents a logical operator (e.g., AND, OR, etc.) compatible with the domain $D_{at}$.

A translation function may be associated with an individual access type $AT_i$, and denoted as $TF_{AT_i}$. In an exemplary embodiment, the translation function $TF_{AT_i}$ is a total function that takes as input a condition at $\boxed{\cdot}$ d (at $\in KS_{AT_i}$) and a keyword at' $\in KS_{AT_i}$ and produces an equivalent condition over keywords at'. The translation function $TF_{AT_i}$ enables the system to determine if two derived access types $AT_i$, are equivalent.

As illustrated in FIG. 4, the relationships between various access types may represented in the form of a directed graph, referred to herein as the access type graph, with the respective nodes of access type graph structure representing the access type. Structure 400 of the access type graph thus illustrates how two access types are related by a directed edge (e.g., arrow) from one node to another. Derived access types may thus be designated by connecting two edges by an AND or OR logical operator, as indicated between first tier 402 and second tier 404.

According to the connected relationships of structure 400, two access types are considered related if the two access types are: (i) descendants of the same access type (e.g., DNS, DHCP, and RIP network services in second tier 404 may be considered related as being "siblings" of the same "parent" access type Network Management Services in third tier 406; similarly, ARP and SSH network services in second tier 404 are considered related as both being descendent "cousins" of "grandparent" WAN Network Services fourth tier 408); (ii) derived using OR operations on other access types and share one or more component access types (e.g., Access Type 1 and Access Type 6 in first tier 402 are related under this consideration); (iii) derived using AND operations on other access types and share all the component access types; and (iv) found related by application of a combination of two or more of the immediately preceding conditions.

The determination of how "closely" related to access types are may be determined according to the depth of traversal on the access type graph (e.g., across tiers 402 through 412 of structure 400) that must be made before a connection between the two access types is found. In an exemplary embodiment, a Likert scale of 3 (e.g., High, Medium and Low) is utilized to represent the relative degree of closeness. In the case where two access types are found to be similar at a High degree, then the trust value of the original trustee may be scaled to 75% for the new requesting device. In a similar manner, a Medium degree of closeness will enable scaling to 50% for the new requesting device, and a Low degree of closeness will enable scaling to 25%.

Relevant Trust Indicators within the Cable Ecosystem

Within the present trust model, several trust indicators for devices may be identified to have significant impact on the security of the cable system operations. These identified trust indicators are categorized below according to their respective functionality. The person of ordinary skill in the art will understand that the respective functionalities do not necessarily indicate the relative importance of one trust indicator with respect to another. A system designer, for example, may choose the relative importance of the categories, and individual components within the categories, according to the individual requirements of that system.

In an exemplary embodiment, the trust indicators are scored on a point basis. Accordingly, when it is determined that the existence of a trust indicator positively helps, enhances, impacts, or sustains the security of the cable infrastructure, a positive point value may be assigned to that trust indicator. In contrast, when it is determined that the trust indicator impacts negatively, a negative point value is assigned.

Identified trust indicators may be broadly categorized according to: (A) an association of a device with the cable system; (B) a device certificate; (C) a device category; (D) a device capability; (E) a network connection type; (F) a physical location of a device; (G) a connection requirement; (H) a connection security; (I) a connection behavior; (J) a present configuration of a device; (K) a traffic (flow) type; (L) a ratio of a present vulnerability estimate to a previous vulnerability estimate; and (M) a device manufacturer trust level. The preceding list of identified trust indicators is provided by way of example, and not in a limiting sense. These identified trust indicators are based on preliminary investigations by the present inventors, who contemplate the inclusion of a number of additional trust indicators within the scope of the present embodiments. These identified trust indicators are described in greater detail as follows.

The association of a device with the cable system may include, as described above, a device that (i) terminates the cable and is managed by the cable system (i.e., the device has a certificate issued under a first-party PKI), (ii) does not terminate the cable but is still managed by the cable system (i.e., the device has at least one certificate issued under the first-party PKI), or (iii) is not managed by the cable system, and may or may not have any PKI certificates.

The device certificate may indicate a number of different evaluations. For example, in the case where a device certificate is evaluated to a trusted root CA and is not expired or revoked, then the device may be given a trust value of 1, and no other trust indicators need be evaluated in this case. However, in the case where a certificate does not chain to a trusted root CA, the certificate is not used (e.g., in any manner) for trust computation. Nevertheless, when a new certificate is presented to the cable system, the new certificate will trigger a re-evaluation of the trust value of the device.

With respect to the device category indicator, an evaluation decision may be based on the potential impact on the cable infrastructure rooted at the local CMTS that might occur in the event of a compromise of a device in that category. The potential impact may be evaluated, for example, on a Likert scale. Device categories may include without limitation: (i) infrastructure networking (e.g., CMTS, routers and switches, servers for network operations, cable services, or customer accounting services); (ii) endpoint networking (e.g., hubs, switches, VoIP, SAN, and routers for Ethernet, Wi-Fi, Zwave, Zigbee, 6lowpan, etc.); (iii) productivity (e.g., printers, scanners, fax machines, computers, tablets, smartphones); (iv) entertainment (e.g., speakers, TVs, music devices, media hubs); (v) safety and security (e.g., motion detectors, security cameras, physical intrusion detectors/preventers, smart doorbells, fire alarms, smoke detectors); (vi) home comfort and convenience (e.g., thermostats, light bulbs, smart electric switches); (vii) utility (e.g., washers, dryers, refrigerators); (viii) medical (e.g., professional devices); (ix) health care devices (e.g., blood pressure monitors, portable EKG devices, insulin pumps); (x) voice control (e.g., Echo, Alexa).

The device capability indicator may be an important trust indicator due to the fact that the higher the capability of the device, the more damage that might potentially result from a malicious exploitation of the device (e.g., as a bot). The device capability may, for example, be considered with respect to the device processor (e.g., microcontroller, general purpose, word size), the available RAM, and/or the storage capability of the device.

The network connection type indicator may consider whether a device is wired or wireless, and the wireless type (e.g., Wi-Fi, Bluetooth, Zigbee, Zwave, etc.). The physical location of device may consider whether the device is unprotected (i.e., no physical barriers to physically accessing the device), partially protected (i.e., some physical barriers to device access), or highly protected (e.g., inside a residential home and only accessible to the home owner or by authorization of home owner). The connection requirement indicator may consider one or more of whether the connection is device-to-device, device-to-cloud, application-to-device, application-to-cloud, etc. The connection security indicator may consider one or more of whether the device is authenticated, whether the device is encrypted, the encryption type (e.g., TLS, DTLS, etc.), the encryption strength.

The connection behavior indicator may consider one or more of (i) whether the connection is to device-initiated or outside-initiated, (ii) the average frequency of connection with outside, (iii) the average duration of connection, (iv) the average bandwidth consumed per connection, (v) the frame rate for traffic, (vi) the traffic type, (vii) the signal strength, (viii) the port numbers, (ix) the types of public-key certificates used, and (x) the packet length deviation (e.g., expected versus observed). The present configuration indicator of the device may consider whether the configuration is the default configuration or according to the latest firmware. The traffic (flow) type indicator may consider TCP and/or UDP flows, as well as traffic analytics.

The ratio of vulnerabilities indicator may, in an exemplary embodiment, evaluate a present estimate of the number of vulnerabilities, y, that might be potentially present in the device firm-ware against a previous estimate, y', computed during the last trust evaluation. The present estimate for y may be quantified as follows.

First, a vulnerability density $V_D$, representing the number of vulnerabilities in the unit size of code, is determined according to $$V_D = \frac{V}{S},$$

where S represents the size of the software and V represents the number of vulnerabilities in the system. In some instances, the vulnerability density $V_D$ may be experimentally evaluated for specific firmware based on the vulnerabilities reported in NVD/CVE and similar vulnerability databases. Second, a rate of vulnerability discovery may be determined according to $$\frac{dy}{dt} = Ay(B - y),$$

where B represents the total number of vulnerabilities, t is the calendar time and A is a constant representing the popularity of a product (assuming, for example, that the more popular a product is, the greater the number of vulnerabilities that may be discovered). The relevant differential equation may then be solved for y, or:

$$y = \frac{B}{BCe^{-ABt} + 1},$$

where C is a constant.

The device manufacturer trust level indicator is explained in greater detail with respect to FIG. 6, below, and represents, in that exemplary embodiment, the device manufacturer trust level indicator as an important indicator in the present trust model which can be mathematically quantified in a reputation based-model. Again, the preceding exemplary trust indicators are provided for illustrative purposes, and are neither limiting nor exhaustive. Additionally, as also described above, each of the trust indicators may be associated with a confidence level that determines the belief in the accuracy of the measurement of the individual trust indicator score.

Trust Management System

Figure 5:
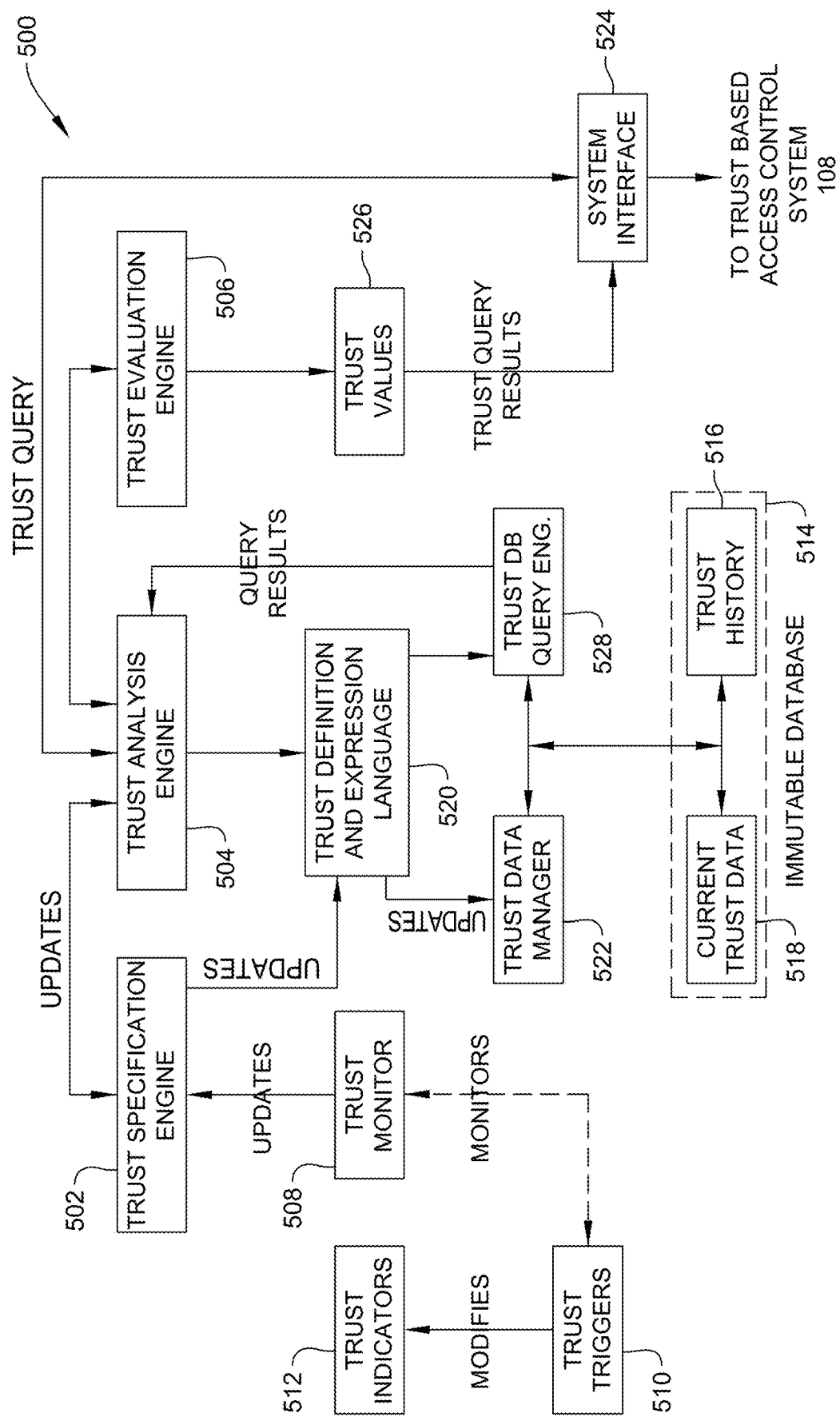
FIG. 5 is a schematic illustration of a trust management system architecture, in accordance with an embodiment.

FIG. 5 is a schematic illustration of a trust management system architecture 500. Architecture 500 may be representative of the structural configuration and functionality of trust management system 106, FIG. 1, and is responsible for monitoring and managing device trust indicators as well evaluating trust levels of devices and answering queries related to device trust. In an exemplary embodiment, architecture 500 includes a trust specification engine 502 configured to define and manage trust relationships, a trust analysis engine 504 configured to process the results of a trust query, a trust evaluation engine 506 configured to evaluate trust relationships, a trust monitor 508 configured to monitor trust triggers 510 in order to update trust relationships, and optionally modify trust indicators 512. In the exemplary embodiment, architecture 500 further includes an immutable database 514 that includes an immutable log 516 of trust history, and a current trust data component configured to manage trust-related data received from architecture 500 and store/record the received data within immutable log 516.

In exemplary operation of architecture 500, communication between trust specification engine 502 and trust analysis engine 504, and to trust specification engine 502 from trust monitor 508, occurs periodically to effectuate updates to trust levels of devices requesting access to the cable system. In an embodiment, architecture 500 further includes a trust definition and expression language subsystem 520 configured to receive periodic updates from trust specification engine 502, and to send periodic updates to a trust data manager 522.

In further exemplary operation of architecture 500, trust analytics engine 504 is configured to receive trust queries from a system interface 524 in operable communication with trust-based access control system 108 (FIG. 1), and communicate with a trust evaluation engine 506, which transmits results of the trust query back to system interface 524. In an exemplary embodiment, the query results are transmitted in consideration of trust values 526. In an embodiment, architecture 500 further includes a trust database query engine 528 configured to further process trust queries received at trust analysis engine 504 (e.g., through trust definition and expression language subsystem 520) and transmit the processed query results back to trust analysis engine 504 prior to transmittal to trust evaluation engine 506.

In at least one embodiment, immutable database 514 is configured to communicate with trust data manager 522 and trust database query engine 528 to receive and record relevant transaction information of updates and queries occurring within the trust management system, and to provide accurate previous data reliably stored within immutable log 516 in response to particular queries. Communication between immutable database 514, trust data manager 522, and trust database query engine 528 is internal to architecture 500 and the trust management system, and may occur periodically, in response to particular queries, or according to a desired configuration of the system operator.

Manufacturer Trust Model

As described above, the reputation of a device manufacturer may provide a useful indicator of the trust level for that particular manufacturer. A cable company, for example, might have a trust opinion about particular manufacturers or vendors that is based on years of experience therewith, or may be based on individual business dealings, partnerships, or simply hearsay within the field. Such trust opinions may therefore be of particular value in the context of the present device trust model, since these perceptions may be mathematically quantified and utilized as device properties, as explained further below with respect to FIG. 6. In modern society, purchasers are known to rely more on devices from a reputed manufacturer than from a manufacturer having a poor reputation (or a primarily unknown reputation, as in the case of new business ventures). Accordingly, a quantified reputation value may be particularly useful in the case where a cable system may not have an initial trust value that is determined based on other properties (described above). In other cases, the reputation value may serve as conservative damping factor against a radical shift in public perception that may or may not be accurate.

Manufacturer Trust Computation

A core idea underpinning the present manufacturer trust model is based upon a group of entities (e.g., cable companies, in the embodiments described herein) posting ratings relevant to various manufacturers based on information selected by the individual entities providing the ratings. An exemplary graphical depiction of a manufacturer rating system is described below with respect to FIG. 6.

Figure 6:
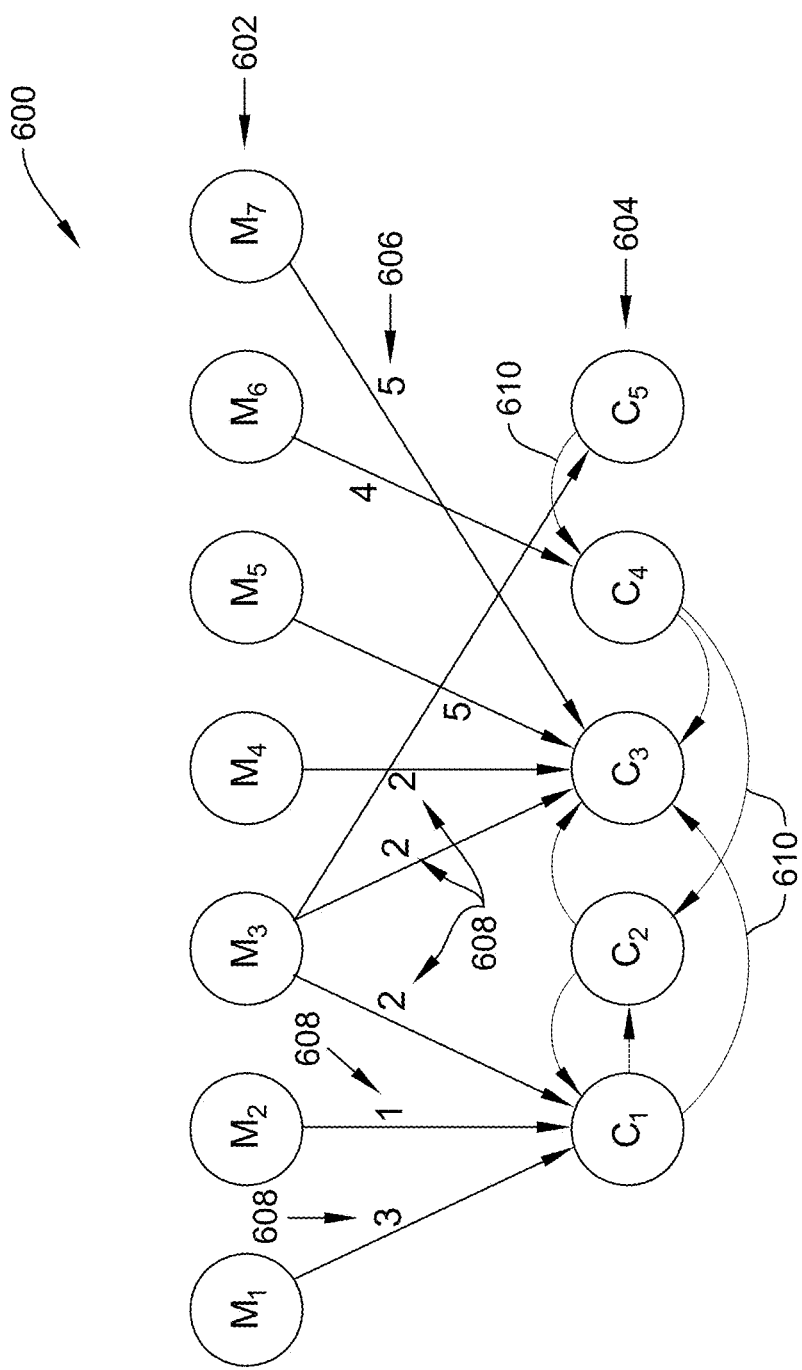
FIG. 6 depicts an exemplary entity rating process, in accordance with an embodiment.

FIG. 6 depicts an exemplary entity rating process 600. In the exemplary embodiment, entity rating process 600 is illustrated according to rankings in the form of a graph. More particularly, process 600 is implemented with respect to a first set of nodes 602 representing the manufacturers (e.g., $M_1$ through $M_7$, in this example) being rated, and a second set of nodes 604 representing the entity companies (e.g., $C_1$ through $C_5$, in this example) providing the manufacturer ratings. In exemplary operation of process 600, when an entity provides a rating of a manufacturer, process 600 indicates on the corresponding graph a first directed edge 606 (i.e., straight arrows depicted in FIG. 6) from the corresponding first manufacturer node 602 to the corresponding entity node 604. In the exemplary embodiment, a weight 608 is assigned to each directed edge 606 depending on how many positive (reputation enhancing) ratings the entity provides for the manufacturer.

Optionally, each entity may rate other entities, as indicated by a second directed (weighted) edge 610 from one entity node (i.e., the entity doing the rating) to another entity node (i.e., the entity being rated). In the embodiment depicted in FIG. 6, weights are not shown on second edges 610 for ease of illustration purposes.

In an exemplary embodiment, information obtained according to process 600 (e.g., captured according to the illustrated graph of FIG. 6) is periodically utilized to calculate a set of graph metrics. First, a sub-graph representing the ratings (e.g., edges 610) of entities $C_i$ rating each other, may be used in isolation in a PageRank algorithm (described further below) to generate a score for the respective entities $C_i$. Second, the entity scores may then be used to weight the respective scoring of the manufacturers $M_j$ (e.g., weights of first edges 606) by a multiplication process. Third, a modified sub-graph that includes the re-weighted edges between manufacturer nodes 602 and cable entity nodes 604 may be considered in isolation, and then used in a HITS algorithm (also described further below) to provide a hub score for manufacturers $M_i$ and an authority score for entities $C_j$.

The value of the hub score and the authority score is based on the concept of that a "good hub" is a node that connects to many "good authorities," and a good authority is a vertex that is connected to by many different hubs. In the context of the reputation graph, a good authority is an entity $C_i$ that provides a significant number of reputation scores to the manufacturers $M_i$ (assumed to be in good faith), while a good hub will typically be the manufacturer $M_i$ that receives more reputation scores than others. A good hub increases the authority measure of the nodes that to which the respective manufacturer $M_i$ points. A good authority thus increases the hub weight of the nodes to which the respective entity $C_i$ points. The hub scores are therefore considered as the baseline trust scores of the manufacturers $M_i$.

Evaluating/Updating Trust Scores

The information contained in the two sub-graphs described above may be represented in the form of adjacency matrices. For example, in a graph=(V, E), vertices $v_i$ and $v_j$ are adjacent, in the case where edge $e_k=(v_i, v_j) \in E$. The corresponding adjacency matrix A of the graph may then be an n×n square matrix (with n being the number of vertices) including rows and columns labeled by the vertices. Each entry $a_{ij}$ of the matrix A may then contain the weight of the edges from vertex $v_i$ to vertex $v_j$, or a 0 value if there is no edge from $v_i$ to $v_j$.

In an embodiment, the PageRank of a vertex is dependent on the topology of the network. The PageRank therefore represents a feedback centrality measure in the sense that the PageRank value of a vertex is dependent on the PageRank of other vertices in the graph that connect to the particular vertex (e.g., "incoming" edges), as well as the number of the other vertices. A directed edge from a vertex to another vertex is thereby considered a "vote of support" for the vertex. A vertex that is connected to many vertices having a high PageRank the value will in itself receive a high PageRank value.

In the case of a directed graph G represented as G=(V,E), having a vertex set V and an edge set E, and where N represents the number of vertices in the graph, (i.e., N=|V|), $LV(v_i)$ will represent a set of vertices that have directed edges to vertex $v_i$, and $OE(v_j)$ will represent the number of outgoing edges on vertex $v_j$. The PageRank $PR(v_i)$ of the vertex $v_i$ may accordingly be expressed as:

$$PR(v_i) = \frac{1-d}{N} + d \cdot \sum_{v_j \in LV(v_i)} \frac{PR(v_j)}{OE(v_j)}$$

where d is a damping factor.

The HITS algorithm for the computation of hubs and authorities measures may be defined iteratively as follows. For a directed graph G=(V, E) having an adjacency matrix A, the hub weight vector HB for the nodes in G may be represented according to:

$$HB = \begin{bmatrix} h_1 \\ h_2 \\ \vdots \\ h_n \end{bmatrix},$$

and the authority weight vector AT for the nodes may be represented according to:

$$AT = \begin{bmatrix} at_1 \\ at_2 \\ \vdots \\ at_n \end{bmatrix}$$

In an exemplary embodiment, at the completion of a $k^{th}$ iteration, the hub weight vector HB may be expressed as $HB_k = (A*A^t)*HB_{k-1}$, and the authority weight vector AT may be expressed as $AT_k = (A^t*A)*AT_{k-1}$, where $A^t$ represents the transpose of the matrix A.

Trust-Based Access Control

The present trust model for the cable infrastructure advantageously enables fine-grained access control of connected devices. In an exemplary embodiment, this fine-grained access control is achieved according to an innovative trust-based access control framework.

Trust-based Access Control Framework Model

Primary elements of the present trust-based access control framework model include the devices, the access types, and the cable system resources, as these various elements are described above. In an exemplary embodiment, the devices may each request a specific type of access to the cable infrastructure resources Devices request access of a specific type to the cable infrastructure resources. An access request can be satisfied according to one or more sets of permissions to access at least one set of resources managed by the cable system. The access requests may be satisfied according to conditions that occur when: (i) a permission is defined as an action on a specific resource (object); (ii) a permission has a consequence cost and cost to effectuate the permission that are determined during a time of access control policy establishment; and (iii) an access request has an associated trust value (or range) that specifies the level of trustworthiness needed for a device to be granted the particular access request.

The present model is based on the presumption that a device has one and only one trust history. Additionally, each device will have a set of one or more trust indicators as described, as described above. Accordingly, when a device requests access to infrastructure resources, the trust-based access control system (e.g., trust-based access control system 108, FIG. 1) may be configured to determine one or more of: (i) whether the trust level of the device allows the desired access, that is, is the trustworthiness of the device greater than or equal to the trust level required to access the requested infrastructure resources; (ii) the cost of the consequences of the set of permissions, as well as the cost of effectuating the set; and (iii) the set of permissions that effectuates the access request, while also minimizes the costs. These model elements are described in greater detail below with respect to FIG. 7.

Figure 7:
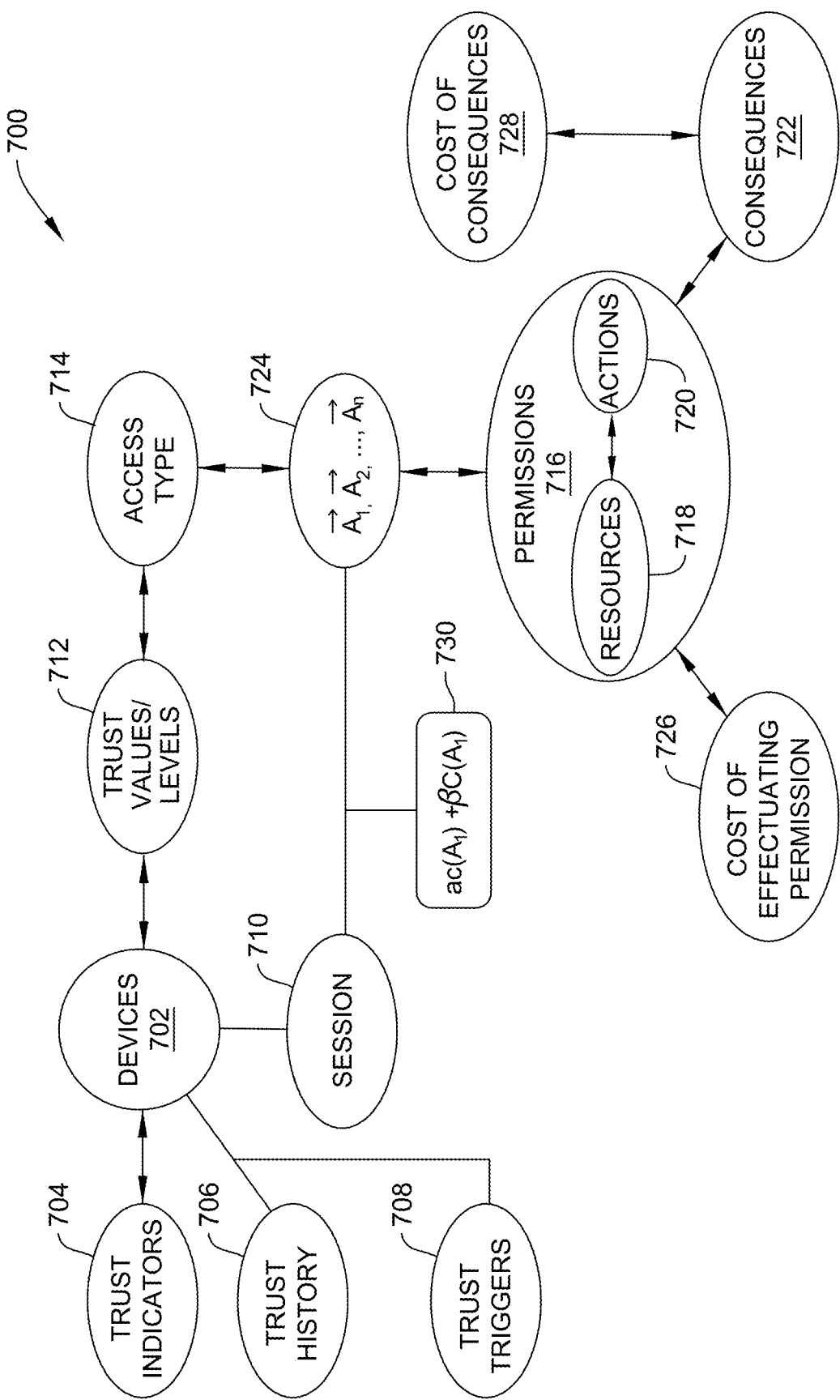
FIG. 7 is a schematic illustration of a trust-based access control model, in accordance with an embodiment.

FIG. 7 is a schematic illustration of a trust-based access control model 700. In the exemplary embodiment, components of model 700 include at least one device 702, one or more trust indicators 704, a trust history 706, one or more trust triggers 708, a session 710, a trust level 712, an access type 714, and a permission 716. In an exemplary embodiment, permission 716 includes at least one resource 718 and an action 720. Components of model 700 further include a consequence 722, an access 724, a first cost 726 of effectuating permission 716, and a second cost 728 of consequence 722. In the exemplary embodiment depicted in FIG. 7, one-directional arrows between model components represent one-to-many relationships, bi-directional arrows represent many-to-many relationships, and lines without arrows represent one-to-one relationships.

In an exemplary embodiment, device 702 may be denoted as $d \in DEVICES$, and defined as an entity that is connected to the cable system on the LAN side and requests access to cable infrastructure. Trust indicators 704 represent an ordered set $p_d$ of measurable properties for each device 702, and may be represented according to the expression $TRUST\_INDICATORS = U_{d \in DEVICES} p_d$. In an exemplary embodiment, a device 702 may manifest measurable values for any subset of $\overline{p} \subseteq p_d$ of trust indicators 704 during a specific session 710. Trust history 706 includes information regarding previous trust values of a device 702 evaluated at various past times, including in a previous session 710', and may be denoted as trust history set of information $\in TRUST\_HISTORY$. Trust trigger 708 may be denoted as trust trigger $\in TRUST\_TRIGGERS$, and represents an event that changes the value of a trust indicator 704, or a clock tick designating a time instance where a change of value for a trust indicator 704 has occurred. In an exemplary embodiment, an occurrence of a trust trigger 708 will cause trust history 706 to be updated.

Session 710 may be denoted as session $\in SESSIONS$, and represents a connection instance of the particular device 702, such as in the case of device 702 requesting access to the cable infrastructure during session 710. In some cases, a single device 702 is capable of instantiating multiple sessions 710. In an exemplary embodiment, session 710 is identified by a unique system-generated ID. Trust level 712 represents a set of real numbers between 0 and 1 indicating the trust level of device 702 at a particular instant of time in session 710, and may be denoted as a TRUST_LEVELS set of possible subsets in the range of [0 . . . 1]. Access type 714 specifies the nature of access 724 that is sought by device 702, and may be denoted as $AT_i \in ACCESS\_TYPES$, representing a set of keywords with relevant associated semantics regarding the resources needed, as well as the relevant outcome.

Permission 716 may be denoted as $a_k \in PERMISSIONS$, and represents an authorization to allow a particular action 724. In an exemplary embodiment, permission 716 includes resource 718 (e.g., denoted as $o_j \in RESOURCES$, representing an object controlled by the cable system and requiring protection) and action 720 (e.g., denoted as $x_i \in ACTIONS$, and representing an operation that may be performed on resource 718). Permission 716 may, for example, be defined as an element of RESOURCES×ACTIONS, that is, PERMISSIONS=$2^{(RESOURCES \times ACTIONS)}$.

Consequence 722 may be denoted as $\xi \in CONSEQUENCES$, and represents a resulting system state when a permission 716 is effectuated. Access 724 may be denoted as $A_l$, and represents an ordered subset of permission 716. In an exemplary embodiment, each access 724 is associated with an access type 714. First cost 726 of effectuating permission 716 represents a real number from a finite, discrete set of real numbers greater than or equal to 0, and which represent the cost incurred by the cable system in enabling permission 716. Similarly, second cost 728 of consequence 722 represents the change of system state when resulting from permission 716 being effectuated. The changed system state may then be considered "better" than, "worse" than, or the same as the original state in terms of security. Regardless of the value of the changed system state, there is a cost that is incurred for being in the new state, which may be denoted as $C \in COST\_OF\_CONSEQUENCES$, and which represents a real number from a finite, discrete set of real numbers greater than or equal to 0.

In exemplary operation of model 700, an association between any two of the model components may be specified by mathematical expressions. For example, the following relations may be defined in the trust-based access control model.

The expression DTA⊆DEVICES×TRUST_INDICATORS defines the device-trust indicator assignment, and represents a many-to-many relation where a device 702 may have many trust indicators 704, and a trust indicator 704 may be similarly associated with many devices 702.

The expression DTH⊆DEVICES×TRUST_HISTORY defines the device-trust history mapping, and represents a one-to-one relation. That is, one device 702 has one trust history 706, and vice versa.

The expression TTT⊆TRUST_TRIGGERS×TRUST_INDICATORS specifies the trust trigger-trust indicator assignment, and represents a many-to-many relation where a trust trigger 708 may cause a change in value for one or more trust indicators 704, and the same trust indicator 704 experience a change in value caused by many trust triggers 708.

The expression DVT⊆DEVICES×TRUST_VALUES defines the device-trust value mapping, and represents a many-to-one mapping from devices 702 to trust values/levels 712. That is, a device 702 may be associated with one and only one trust value 712. However, many devices 702 may have the same trust value 712.

The expression TAT⊆TRUST_VALUES×ACCESS_TYPES defines the particular trust value 712 needed for a specific access type 714, and represents a many-to-many mapping.

The expression ATA⊆ACCESS_TYPE×ACCESS defines the access type-access mapping, and represents a many-to-one mapping from access type 714 to access 724. That is, a number of access types 714 may imply the same access 724; however, every access 724 will be of one specific access type 714.

The expression ACP⊆ACCESS×PERMISSIONS defines permissions 716 needed for a specific access 724, and represents a many-to-many relation.

The expression PCE⊆PERMISSIONS×COST_OF_EFFECTUATING_PERMISSION is a many-to-many relation, and represents a mapping that defines the relation between permission 716 and first cost 726 associated with implementing permission 716. First cost 726 may be denoted as c∈PCE, and further represents a real number from a finite set of numbers greater than or equal to 0.

The expression PEC⊆PERMISSIONS×CONSEQUENCES represents a mapping that defines the many-to-many relation between permissions 716 and consequences 722. A permission consequence may be denoted as E PEC, and represents the consequence of effectuating the permission.

The expression CCS⊆CONSEQUENCES×COST_OF_CONSEQUENCES represents a many-to-many mapping between consequences 722 and second cost 728 of consequences 722. As described above, a cost element C∈CCS represents a real number greater than or equal to 0, indicating the specific cost associated with a specific consequence.

In an exemplary embodiment, model 700 further includes a constraint 730, which may be denoted as $\min(\alpha.c(A_i)+\beta.C(A_i))$, and which defines an expression involving elements of PCE and CCS that is to be minimized in order to optimally select an appropriate set of access 724 in a session 710.

Access Control Effectuation

In an exemplary embodiment, the CM advantageously provides a connected device different levels of access to the cable infrastructure by effectuating a set $\vec{A}=[a_1, a_2, \ldots, a_n]$ of accesses from a set of possible accesses. For purposes of this description, the accesses may be considered to be sets of permissions, and that fine granular access may be defined relevant to the cable network system. Accordingly, as described above with respect to FIG. 7, each permission allowed by the CM, when effectuated, will change the state of system. Thus, given a set S of mutually exclusive states, then $\xi_{x,s} \in X \times S$ defines the consequence of permission x on state s. Furthermore, the effectuation of each permission $a_i$ will result in an associated cost $c(a_i)$. Therefore, the cost $c(\vec{A})$ of $\vec{A}$ may be represented as:

$$c(\vec{A}) = \sum_{i=1}^{n} c(a_i)$$

As described above, every permission has a consequence and every consequence has an associated cost. Given that a consequence $\xi_{x,s}$, and its associated cost denoted as $C(\xi_{x,s})$, the cost $C(\vec{A})$ of consequence of $\vec{A}$ may be expressed as:

$$C(\vec{A}) = \sum_{i=1}^{n} C(\xi_{x,s})$$

In an exemplary embodiment, permissions are assigned to trust values when access control policies are specified, and a trust value (or a range) defines a set of allowable permissions. These concepts emphasize the innovative operation of the trust-based access control system implementing the access control framework and model described herein.

The principle of the trust-based access control system are therefore further applicable to the processes by the cable system grants access to the device based on the trust values. For example, the CM may initially select a permission x based on the trust value $$V_t(CM_i \stackrel{c}{\Rightarrow} D_j),$$

which the CM may have on the corresponding device. For a given trust value, there may potentially be several allowable permission sets $\vec{A}_1, \vec{A}_2, \ldots, \vec{A}_k$. A goal of the trust-based access control system is to dynamically associate a permission set $\vec{A}_i$ from the plurality of sets $\vec{A}_1, \vec{A}_2, \ldots, \vec{A}_k$ to a device during a session (e.g., a device connecting to a modem for sending traffic) such that the risk/benefit expression $\alpha c(\vec{A}_i) + \beta C(\vec{A}_i)$ may be minimized. In this example, $\alpha$ and $\beta$ are constants that specify the preference weights given to the cost of the action and the cost of the consequence by the cable operator, and according to the limitation $\alpha + \beta = 1$.

Figure 8:
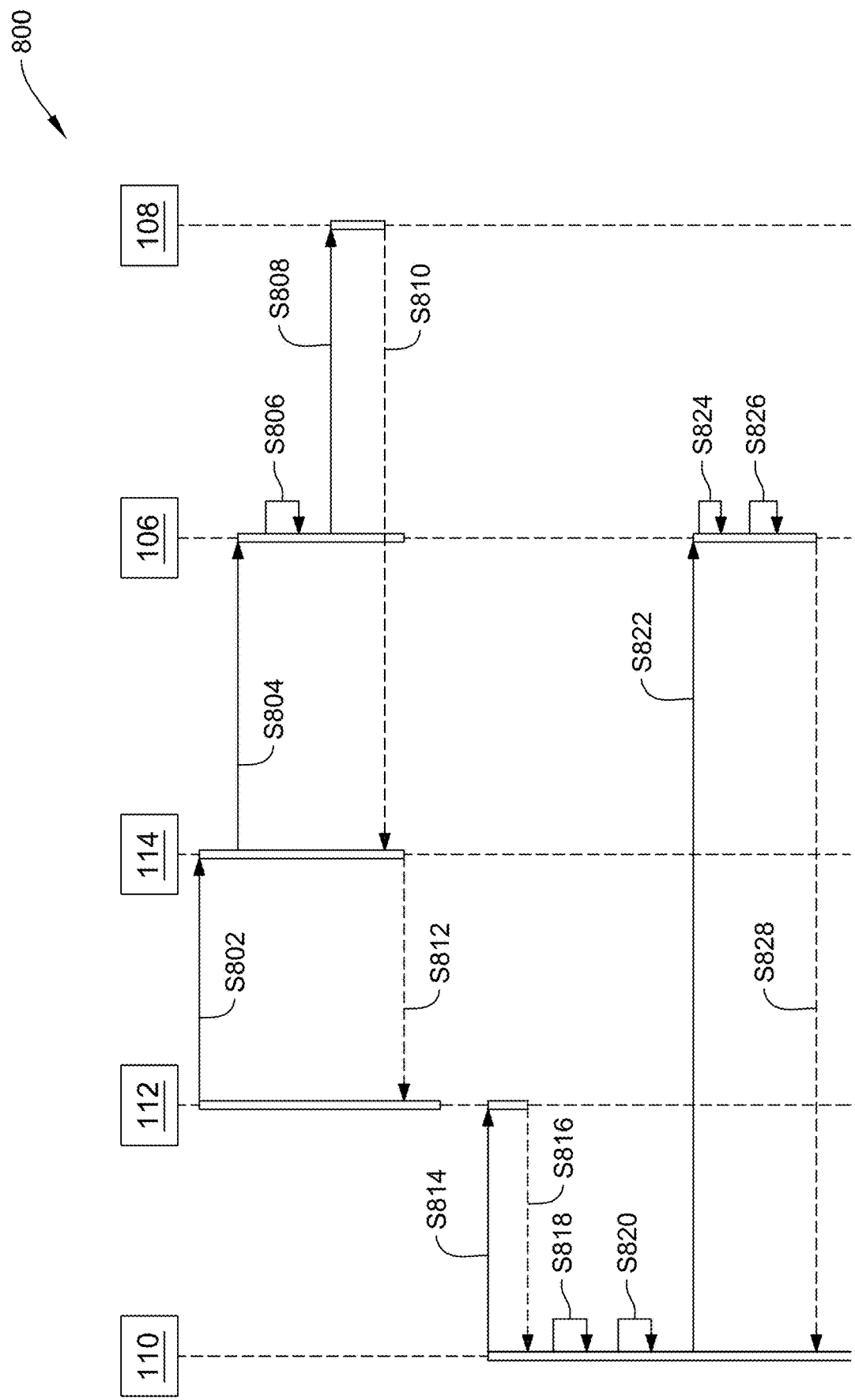
FIG. 8 depicts a sequence diagram for a trust-based access control protocol, in accordance with an embodiment.

FIG. 8 depicts a sequence diagram for a trust-based access control protocol 800. In an exemplary embodiment, protocol 800 is executed with respect to one or more elements of architecture 100, FIG. 1, including trust monitoring system 110, device 112, cable system 114, trust management system 106, and trust-based access control system 108. Unless otherwise described herein to the contrary, a sequence process of protocol 800 may execute one or more of the following steps in any particular order, sequentially or in parallel, and/or substantially simultaneously.

Process 800 begins at step S802, in which device 112 requests access to cable system 114. In an exemplary embodiment of step S802, the access request includes at least one device parameter and the requested access type. In step S804, cable system 114 where a trust management system 102 to evaluate the trustworthiness of device 112 for the requested access type. In an exemplary embodiment of step S804, the evaluation query includes the device parameter and the requested access type. In step S806, trust management system 102 calculates a trust value for device 112. In an exemplary embodiment of step S806, the calculated trust value is based on the received device parameter(s).

In step S808, trust management system 102 forwards the query to trust-based access control system 108 to evaluate the access type for device 112. In an exemplary embodiment of S808, both the calculated trust value for device 112 and the requested access type are provided to trust-based access control system 108. In some embodiments, trust-based control access system 108 may further process the access type request to determine the access type.

Step S810 is optional. In step S810, in response to, for example, an access grant request or query, trust-based control access system 108 may provide cable system 114 an access grant response based, at least in part, on the determined trust value for device 104. Step S812 is also optional. In step S812, in the case where an access grant response is provided to cable system 114 in optional step S810, cable system 114 may be further configured to forward the access response to requesting device 112. In an exemplary embodiment of step S812, the forwarded access response includes the access type, if any, determined by trust-based access control system 108.

In step S814, trust monitoring system 110 is configured to transmit a periodic device evaluation update request to device 112. In step S816, device 112 responds to trust monitoring system 110 with a corresponding periodic device evaluation response. In an exemplary embodiment of step S816, the periodic device evaluation response from device 112 includes at least one updated device parameter obtained at different time from the last device evaluation response. In step S818, trust monitoring system 110 checks the updated parameters, and in step S820, trust monitoring system 110 stores the updated parameters for device 112 (e.g., in an immutable ledger).

In step S822, trust monitoring system 110 provides updated device trust information regarding device 112 to trust management system 106. In an exemplary embodiment of step S822, the updated device trust information includes at least one of the updated device parameters from step S818. In step S824, trust management system calculates a new trust value for device 112 based on at least one updated device parameter received in step S822 from trust monitoring system 110. In step S826, trust management system 106 is configured to store the updated trust value for device 112 (e.g., also in an immutable ledger) and/or trust history log 200, FIG. 2. Step S828 is optional. In step S828, trust management system 106 is further configured to provide an updated response to trust monitoring system 110 for the device trust corresponding to device 112 at the new given time.

As described above, cable companies in particular strive to protect their various infrastructures from cyber-attacks that perpetrate theft of service and injection of malicious software into the system, thereby causing major disruption of services. There are potentially several entry points into the cable infrastructure for such malicious attacks including, for example, through devices that define the infrastructure (e.g., routers and switches, various servers, etc.), as well as devices that attach to the infrastructure at the end-points to provide customer experiences.

Cable companies take significant measures to secure devices that define the infrastructure, but pay particular attention to the end-point devices. The current DOCSIS 3.1 standard defines how the link between the CM (which, for all practical purposes, can be said to terminate the cable), on the one hand, and the CMTS, on the other hand, is protected. Properly enforced DOCSIS 3.1 ensures that only authenticated CMs that are certified to be free of malware will be permitted to on-board to a CMTS, that all communications between a CM and a CMTS are encrypted, and that firmware updates to the CM are from authenticated sources.

However, DOCSIS 3.1 does not address the problem of securing the LAN connected to the CM. Thus, a malicious device connected on the LAN side can still pose significant threat to the cable infrastructure. This application explores, among other things, a key question regarding the possibility of regulating access to the cable infrastructure by various LAN side devices based upon how much those devices can be trusted to not cause any damage, and what it takes to achieve such dynamic, regulated, and non-binary access.

To determine the level of trustworthiness of LAN-side devices, the present distributed trust model was developed. A review was undertaken to evaluate key definitions, standards, operational practices and processes, regulatory and technical questions, and customer experiences involved in various ecosystems that interoperate with cable was undertaken to provide further shape to the several models described herein. Some devices, for example, are known to have certain properties that can be measured and which, when evaluated, may be aggregated to build a trust value for the device.

Examples of such properties include without limitation physical specifications of the device, a connection profile, the physical location, etc. Devices manufactured by trusted or trustworthy manufacturers are considered to be trustworthy, and hence one of the properties of devices, described herein, is proposed as the trustworthiness of the manufacturer. A reputation model of trust for manufacturers as also described above, and additionally, a trust-based access control framework and model as described above to rely on trust level of devices to make access control decisions.

The need for a non-binary model of trust was established by the present inventors based on observations of the prevalence of IoT devices on the market increasing in an explosive manner, with more and more devices appearing on the market having manufacturing origins that are not, or cannot be, certified. Nevertheless, a PKI-based solution may not be feasible for establishing trustworthiness of all devices. However, given that the IoT world it is unlikely to stabilize in growth anytime soon, conventional standards must be improved upon, namely, to establish and adopt new standards, well also working to make sure that market shares are better structured.

Nonetheless, assuming that a non-binary model is useful, it might be considered useful only to an extent that fine-granular access to a cable infrastructure is needed. In some embodiments, the fine granular access control provides flexibility as well as enhances security from the cable operator's perspective. However, implementation of the fine granularity comes with its own additional implementation and operational costs as well. Moreover, fine granular access control would provide a very different customer experience than is currently by conventional techniques. Two exemplary scenarios are provided to illustrate customer experiences cases and the potential impact thereupon.

In one exemplary scenario, a device has been evaluated as non-trustworthy. Should the cable system impair network performance to the point that a consumer would notice, or to the point the device is useless? If the device is blocked, how should the blocking decision be communicated to the customer of the device. What remedy does the customer have when the device is blocked.

In another exemplary scenario, a critical device (such as a medical device) has been evaluated according to the several methods and systems herein, and found to be non-trustworthy, and is subsequently blocked. Should the consumer owner of the device be allowed to override the block based on the critical nature of the device? On what basis is the determination of what constitutes a critical device made?

In an operational setting, if the only decision that is needed is whether devices can send packets over cable or not, then implementation of the present distributed non-binary model and associated access control model may potentially represent a form of security overkill. The present inventors therefore further contemplate additional integration of the establishment of additional fine granular policies to handle less trustworthy devices.

The evaluation of device properties, for devices having several types of data, may be performed using the data capture and analysis techniques described above. Some of the captured data might be potentially sensitive (e.g., communication patterns or source and destination address can reveal confidential information; a heart monitor communicating frequently to a hospital indicating a customer/patient having a serious medical emergency). Although the present embodiments are not directed toward answers to these particular policy questions and challenges, the systems and methods described herein nevertheless provide more reliable techniques for monitoring and enforcing policy standards put in place by system operators.

More particularly, it is the opinion the present inventors that, for transparency reasons, and to provide certain initial levels of trust to the consumer, the present systems and methods simplify the process and ease with which a consumer may be notified about (i) what data is being collected from the consumer devices, (ii) what the collected data is being used for, (iii) what are the data retention policies for the collected data, (iv) how is old data purged, and (vi) if and how the data is, or may potentially be, shared with others. The present framework embodiments may be implemented with respect to a number of different network interfaces, and thus do not preclude a cable system from having, for example, a web-based interface to the trust management system information store that may be used to alert the customer know what information about a specific device has been collected.

With respect to the issue of transparency of manufacturer trust establishment, as described above with respect to FIG. 6, there may be two different ratings that are used in the rating process, namely, a rating of cable companies/entities by other cable companies on the one hand, and a rating of manufacturer by cable companies on the other hand. The particular model embodiments described herein, which are capable of quantifying large amount of opinion data, renders the associated rating process subject to particular concerns with regard to errors, biases (intentional and unintentional), and potential abuses. As described above, however, the manufacturer trust modeling techniques may employ a built-in conservative damping factor to mitigate these risks.

With respect to unintentional errors experienced during operation the manufacturer rating system, the model assumes that the entities providing manufacturer ratings are fairly basing the ratings on their own experiences with these manufacturers. However, even when the rating process is performed fairly, there is a possibility that some error has been committed by the entity in defining these ratings. For example, a business dispute may lead to a bad rating from a company entity to the manufacturer. Accordingly, in some of the embodiments described herein, a blockchain technology is proposed as the immutable ledger to securely allow all parties to reliably verify that the rating information is at least based on correct information, and not errors.

In other instances, the embodiments described above may further include some form of vetting process by independent and unbiased third parties that establishes a consensus among these parties that there is no error in the evidence, and that the rating is justified based on the objective evidence. Blockchain technology may be useful in this regard as the immutable ledger, due to the openness, verifiability, and immutability of this technology. Other useful blockchain properties include peer-to-peer functionality that encourages consensus building.

Biases (whether intentional or unintentional) may nevertheless occur in the implementation of either of the PageRank and the HITS algorithms (described above). Both of these algorithms are described herein though, to include robust safeguards against biases, due to their respective algorithm ratings being averaged out by other entities providing ratings. However, collusion among groups might potentially skew the ratings, which is a general problem experienced by virtually all rating systems, and may often occur in the case where malicious adversaries are able to penetrate the rating system. There are some algorithms though, that can potentially detect such malicious adversaries and bad faith collusion. However, these choices involve some level of the tradeoff among the cost versus value relation.

Final implementation deployment questions and challenges remain for further development and contemplated solutions. The present inventors contemplate significantly further integration development. To such important challenges include: (i) what properties of devices result in discernible changes in trust values of the devices and whether the set of properties is sound and complete; and (ii) how to evaluate the set of properties in such a manner as to establish and quantifiable belief, disbelief, and uncertainty values based on the measurements. The present inventors contemplate solutions to these, and still further challenges, that fully integrate with the principles described among the several embodiments of this disclosure, and are also within the scope of the present embodiments and the many inventions represented thereby.

Exemplary embodiments of systems and methods for trust evaluation and establishment in a network environment are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A trust management system for a network communication ecosystem including a plurality of participating entities, comprising:
    a processor in communication with the plurality of participating entities; and
    a memory device in operable communication with the processor, the memory device including computer-executable instructions stored therein, which, when executed by the processor, cause the processor to:
        (i) define and manage trust relationships between a first entity and a second entity of the plurality of participating entities;
        (ii) process results of a trust query from the first entity to the second entity at a first time;
        (iii) evaluate the trust relationship at the first time;
        (iv) generate a first trust value for the first entity based on one or more trust indicators of the first entity determined for the first time;
        (v) monitor the one or more trust indicators over time;
        (vi) determine, at a second time subsequent to the first time, a change to at least one trust indicator of the one or more trust indicators; and
        (vii) provide, based on the determined change at the second time, a second trust value for the first entity different from the first trust value.

2. The system of claim 1, wherein the first entity is a first electronic device connected to the network communication ecosystem.

3. The system of claim 2, wherein the first electronic device is a modem termination system (MTS) managed by a network infrastructure of the network communication ecosystem.

4. The system of claim 3, wherein the second entity is a modem configured to request access from the MTS to the network infrastructure.

5. The system of claim 2, wherein the first electronic device is a modem.

6. The system of claim 5, wherein the modem is configured to bear at least one public key certificate validating to a root certificate authority (CA) trusted by the network infrastructure.

7. The system of claim 6, wherein the second entity is a second electronic device configured to connect with the Internet of Things (IoT).

8. The system of claim 7, wherein the second electronic device is configured to communicate with the modem to request access from the modem to the network infrastructure.

9. The system of claim 8, wherein the instructions further cause the processor to analyze a trust query, submitted by the modem, regarding a trustworthiness of the second electronic device.

10. The system of claim 9, further comprising a system interface, and wherein the instructions further cause the processor to receive the trust query by way of the system interface.

11. The system of claim 10, wherein the instructions further cause the processor to (i) evaluate the analyzed trust query, and (ii) provide results of the evaluated trust query to the system interface.

12. The system of claim 11, wherein the instructions further cause the processor to process received trust queries.

13. The system of claim 12, wherein the instructions further cause the processor to manage and store, within an immutable database, trust-related data transmitted within the trust management system.

14. The system of claim 13, wherein the immutable database includes an immutable log of trust history, and a current trust data component configured to (i) manage trust-related data received from the trust management system, and (ii) store the received trust-related data in the immutable log of trust history.

15. The system of claim 14, wherein the immutable log comprises at least one of a distributed digital ledger and a blockchain.

16. The system of claim 11, wherein the instructions further cause the processor to (i) evaluate the analyzed trust query, and (ii) provide results of the evaluated trust query to the system interface.

17. A communication network ecosystem, comprising:
    a server in communication with a network infrastructure, the server configured to
        (i) receive, at a first time, an access request from a separate first connective device, and (ii) process the received device access request;
    a trust management system in communication with the server and configured to define and manage a trust relationship between the network infrastructure and the first connective device;
    a trust-based access control system in communication with the server and the trust management system, and configured to determine (i) a first trust level of the first connective device at the first time, (ii) a first set of permitted access levels corresponding to the determined first trust level at the first time, and (iii) at least one access type included in the received device access request; and
    a trust monitoring system in communication with the first connective device and the trust management system, and configured to (i) monitor at least one of the trust management system and the first connective device for trust indicator values of the first connective device relative to the network infrastructure, (ii) at a second time subsequent to the first time, detect a change to at least one of the trust indicator values, (iii) communicate the detected change to the trust-based access control system to enable the trust-based access control system to determine a second trust level of the first connective device at the second time, wherein the second trust level is different from the first trust level.

18. The network of claim 17, wherein the trust-based access control system includes a decision engine configured to select, from the first set of permitted access levels, a device access level relevant to the device access request.

19. The network of claim 18, wherein the decision engine is configured to implement a trust-based access control model.

20. The network of claim 19, wherein the trust-based access control model includes at least one of the one or more trust indicator values, a trust history, a trust trigger, a session, the first trust level, the second trust level, an access type, a permission, a resource, an action, a consequence, the permitted access levels, a cost of effectuating the permission, and a cost associated with the consequence.

* * * * *